(12) United States Patent
Nduka et al.

(10) Patent No.: US 11,482,043 B2
(45) Date of Patent: Oct. 25, 2022

(54) BIOMETRIC SYSTEM

(71) Applicant: EMTEQ LIMITED, Brighton (GB)

(72) Inventors: Charles Nduka, Brighton (GB);
Mahyar Hamedi, Brighton (GB);
Graeme Cox, Brighton (GB)

(73) Assignee: EMTEQ LIMITED, Brighton (GB)

( * ) Notice: Subject to any disclaimer, the term of this patent is extended or adjusted under 35 U.S.C. 154(b) by 132 days.

(21) Appl. No.: 16/489,297

(22) PCT Filed: Feb. 27, 2018

(86) PCT No.: PCT/GB2018/050510
§ 371 (c)(1),
(2) Date: Aug. 27, 2019

(87) PCT Pub. No.: WO2018/154341
PCT Pub. Date: Aug. 30, 2018

(65) Prior Publication Data
US 2020/0065569 A1    Feb. 27, 2020

(30) Foreign Application Priority Data

Feb. 27, 2017   (GB) ................................. 1703133
Jul. 25, 2017   (GB) ................................. 1711978

(51) Int. Cl.
*G06K 9/00*    (2022.01)
*G02B 27/01*   (2006.01)
(Continued)

(52) U.S. Cl.
CPC ......... *G06V 40/176* (2022.01); *G02B 27/017* (2013.01); *G06F 21/32* (2013.01);
(Continued)

(58) Field of Classification Search
CPC .... G02B 2027/0178; G02B 2027/0187; G02B 27/017; G06F 21/32; G06K 9/00255;
(Continued)

(56) References Cited

U.S. PATENT DOCUMENTS 8,065,529 B2    11/2011  Hively
9,931,171 B1*   4/2018   Peyman .................. A61B 3/14
(Continued)

FOREIGN PATENT DOCUMENTS

AU    2013100576 A4    6/2013
AU    2015202397 A1    5/2015
(Continued)

OTHER PUBLICATIONS

Mitra, Sinjini, and Marios Sawides. "Analyzing asymmetry biometric in the frequency domain for face recognition." Proceedings. (ICASSP'05). IEEE International Conference on Acoustics, Speech, and Signal Processing, 2005.. vol. 2. IEEE, 2005. (Year: 2005).*
(Continued)

*Primary Examiner* — Michael J Vanchy, Jr.
(74) *Attorney, Agent, or Firm* — Kenealy Vaidya LLP

(57) ABSTRACT

Some embodiments are directed to a biometric authentication system including headwear having a plurality of biosensors each configured to sample muscle activity so as to obtain a respective time-varying signal, a data store for storing a data set representing characteristic muscle activity for one or more users, and a processor configured to process the time-varying signals from the biosensors in dependence on the stored data set so as to determine a correspondence between a time-varying signal and characteristic muscle activity of one of the one or more users, and in dependence on the determined correspondence, authenticate the time-varying signals as being associated with that user.

17 Claims, 20 Drawing Sheets

(51) Int. Cl.
  *G06F 21/32* (2013.01)
  *G06K 9/20* (2006.01)
  *G06V 40/16* (2022.01)
  *G06V 10/147* (2022.01)
  *G06V 40/20* (2022.01)
  *G06V 40/70* (2022.01)

(52) U.S. Cl.
  CPC .......... *G06V 10/147* (2022.01); *G06V 40/166* (2022.01); *G06V 40/167* (2022.01); *G06V 40/20* (2022.01); *G06V 40/70* (2022.01); *G02B 2027/0178* (2013.01)

(58) Field of Classification Search
  CPC .......... G06K 9/00261; G06K 9/00315; G06K 9/00335; G06K 9/00892; G06K 9/2036; G06K 9/209
  See application file for complete search history.

(56) References Cited

U.S. PATENT DOCUMENTS

| | | | |
|---|---|---|---|
| 10,445,481 B1* | 10/2019 | Sokolov | G06F 21/577 |
| 2002/0143263 A1* | 10/2002 | Shusterman | A61B 5/349 |
| | | | 600/509 |
| 2007/0060830 A1 | 3/2007 | Le et al. | |
| 2008/0092232 A1* | 4/2008 | Lu | G06F 21/32 |
| | | | 726/20 |
| 2013/0185144 A1 | 7/2013 | Pradeep et al. | |
| 2014/0075548 A1 | 3/2014 | Sampathkumaran et al. | |
| 2014/0126782 A1* | 5/2014 | Takai | G06F 3/04842 |
| | | | 382/116 |
| 2015/0074797 A1* | 3/2015 | Choi | G06F 21/32 |
| | | | 726/19 |
| 2015/0154392 A1 | 6/2015 | Bao et al. | |
| 2015/0157255 A1* | 6/2015 | Nduka | A61B 5/442 |
| | | | 600/301 |
| 2015/0304322 A1 | 10/2015 | Zaidi et al. | |
| 2016/0021106 A1 | 1/2016 | Navratil et al. | |
| 2016/0342782 A1 | 11/2016 | Mullins et al. | |
| 2018/0303667 A1* | 10/2018 | Peyman | A61B 34/35 |
| 2019/0101977 A1 | 4/2019 | Armstrong-Muntner et al. | |

FOREIGN PATENT DOCUMENTS

| | | |
|---|---|---|
| WO | WO2016025323 A1 | 2/2016 |
| WO | WO2016025323 A8 | 2/2016 |
| WO | 2016165052 A1 | 10/2016 |

OTHER PUBLICATIONS

Mitra, Sinjini, Marios Sawides, and BVK Vijaya Vijaya Kumar. "Face identification using novel frequency-domain representation of facial asymmetry." IEEE Transactions on Information Forensics and Security 1.3 (2006): 350-359. (Year: 2006).*

Liu, Yanxi, et al. "Facial asymmetry quantification forexpression invariant human identification." Computer Vision and Image Understanding 91.1-2 (2003): 138-159. (Year: 2003).*
Mitra, Sinjini, Marios Savvides, and Anthony Brockwell. "Statistical performance evaluation of biometric authentication systems using random effects models." IEEE Transactions on Pattern Analysis and Machine Intelligence 29.4 (2007): 517-530. (Year: 2007).*
Jul. 11, 2018 International Search Report (ISR) issued in International application No. PCT/GB2018/050510.
Jul. 11, 2018 Written Opinion of the International Searching Authority (ISR) issued in International application No. PCT/GB2018/050510.
Muhammed, et al., "Optomyography (OMG): A Novel Technique for the Detection of Muscle Surface Displacement Using Photoelectric Sensors," School of Technology and Health STH, Royal Institute of Technology KTH Stockholm, Sweden, 4 pgs.
Chuang, "One-Step Two-Factor Authentication with Wearable Bio-Sensors," WAY'14, Jul. 9, 2014, University of California, Berkeley, pp. 1-3.
Chuang, "New Research: Computers That Can Identify You by Your Thoughts," UC Berkeley School of Information, Apr. 3, 2013, http://www.ischool.berkeley.edu/newsandevents/news/20130403brainwaveauthentication, pp. 1-5.
Chuang, "I Think, Therefore I Am: Usability and Security of Authentication Using Brainwaves," UC Berkeley, pp. 1-16.
Klonovs, et al.,"Development of a Mobile EEG-Based Feature Extraction and Classification System for Biometric Authentication," Master thesis, 2012, pp. 1-86.
Cannan, et al., "Automatic User Identification By Using Forearm Biometrics," 2013 IEEE/ASME International Conference on Advanced Intelligent Mechatronics (AIM) Wollongong, Australia, Jul. 9-12, 2013, pp. 710-715.
Simonite, "Oculus Rift Hack Transfers Your Facial Expressions onto Your Avatar," https://www.technologyreview.com/s/537566/oculusrifthacktransfersyourfacialexpressionsontoyouravatar/, May 20, 2015, pp. 1-4.
Nait-Ali, et al. (editors), "Signal and Image Processing for Biometrics," John Wiley & Sons, Inc., NJ 2012, 14 pgs.
Schneegass, et al., "SkullConduct: Biometric User Identification on Eyewear Computers Using Bone Conduction Through the Skull," CHI'16, May 7-12, 2016, San Jose, CA, USA, pp. 1-6.
Graham, "Samsung's FaceSense Enables Hands-Free VR Interfacing," https://www.vrfocus.com/, May 3, 2017, 6 pgs. 449-460.
"What EEG can do for Virtual Reality," https://thestack.com/world/2016/02/03/eegfeedbackoffersinterestingpossibilitiesforvirtualreality/, Jun. 20, 2016, 3 pgs.
Benedikt, et al., "Assessing the Uniqueness and Permanence of Facial Actions for Use in Biometric Applications," IEEE Transactions on Systems. Man. and Cybernetics—Part A: Systems and Humans. vol. 40. No. 3. May 2010.
Sun Ye, et al., "Capacitive Biopotential Measurement for Electrophysiological Signal Acquisition: A Review," IEEE Sensors Journal, vol. 16, No. 9, May 1, 2016, pp. 2832-2853.
Pal, et al., "Evaluation of Bioelectric Signals for Human Recognition," Procedia Computer Science 48 (2015), pp. 746-752.
May 31, 2022 European Search Report issued in European Patent Application No. 22157347.

* cited by examiner

SECTION A-A

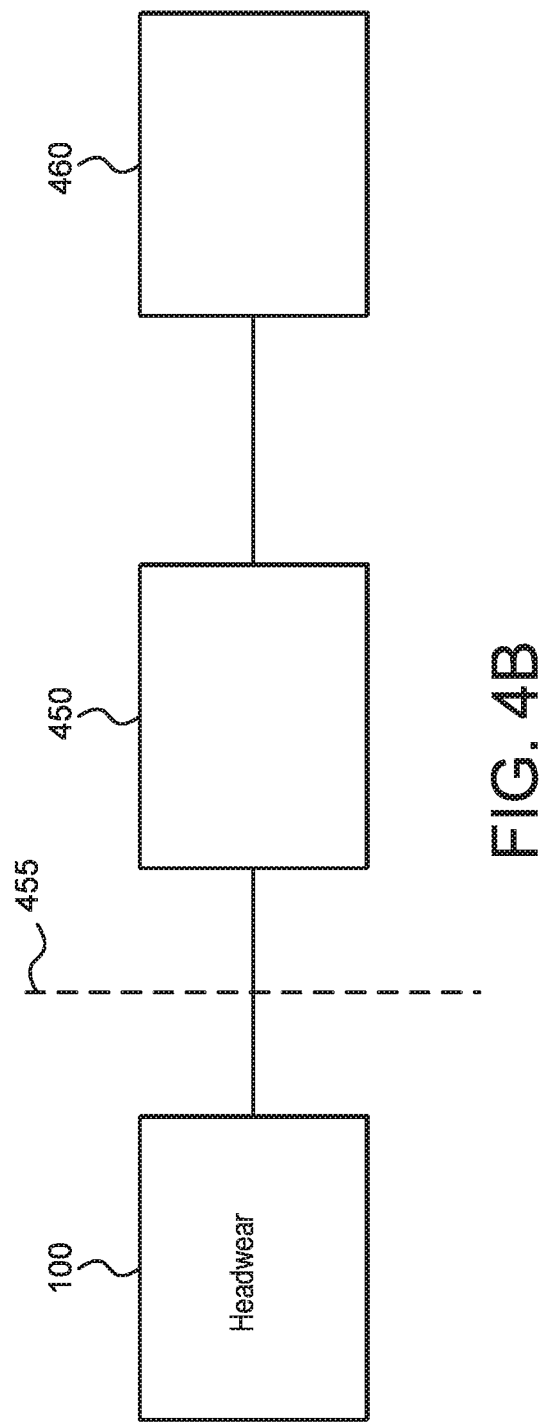

BIOMETRIC SYSTEM

CROSS REFERENCE TO RELATED APPLICATIONS

This application is a national phase filing under 35 C.F.R. § 371 of and claims priority to PCT Patent Application No. PCT/GB2018/050510, filed on Feb. 27, 2018, which claims the priority benefit under 35 U.S.C. § 119 of British Patent Application Nos. 1703133.7 and 1711978.5, filed on Feb. 27, 2017 and Jul. 25, 2017 respectively, the contents of each of which are hereby incorporated in their entireties by reference.

BACKGROUND

Some embodiments relate to a system for detecting facial biosignals for biometric authentication. In particular, some embodiments relate to systems for detecting facial muscle activity and facial skin characteristics.

Several advanced technologies have been developed for biometric identification, including fingerprint recognition, retina and iris recognition, face recognition, and voice recognition. For example, Shockley et al., U.S. Pat. No. 5,534,855, generally describes using biometric data, such as fingerprints, to authorise computer access for individuals. Scheidt et al., U.S. Pat. No. 6,490,680, describes identity authentication using biometric data. Dulude et al., U.S. Pat. No. 6,310,966, describes the use of fingerprints, hand geometry, iris and retina scans, and speech patterns as part of a biometric authentication certificate. Murakami et al., U.S. Pat. No. 6,483,929, generally describes "physiological and histological markers," including infra-red radiation, for biometric authentication. However, these types of technologies have penetrated markets can be only in a limited fashion due to complicated and unfriendly acquisition modalities, sensitivity to environmental parameters (such as lighting conditions and background noise), and high cost. In addition, due to complicated acquisition procedures, the foregoing technologies usually may require operator attendance.

Fingerprint recognition is well-established and the most mature technology of the group. But it has several drawbacks: a fingerprint recognition system cannot verify physical presence of the fingerprint owner and therefore is prone to deception, limiting its suitability for on-line applications; the optical sensor is a costly and fragile device generally unsuitable for consumer markets; the system suffers from negative connotations related to criminology.

Retina scanning technologies are characterised by high performance. However, they may require high-precision optical sensors, and are not user-friendly because they may require manipulation of head posture and operate on a very sensitive organ—the human eye. The optical sensor is also costly and fragile.

Iris and face recognition systems are user-friendly technologies since they record an image from afar and are not intrusive. However, they may require digital photographic equipment and are sensitive to lighting conditions, pupil size variations and facial expressions. In addition, iris recognition performance is degraded by the use of dark glasses and contact lenses, and face recognition may be deceived by impersonation. Face-based systems based on computer vision have been described when the imaging system is separate from the user and performs facial recognition plus gesture recognition. An example of this is Wang et al (U.S. Pat. No. 9,202,105).

Voice recognition is the most user-friendly technology of the group. However, it may require a low-noise setting and is highly sensitive to intrinsically variable speech parameters, including intonation. Moreover, existing conventional recording technologies may be used to deceive speech-based recognition systems.

An ideal biometric should have very low intra-subject variability, very high inter-subject variability, very high stability over time and reproducibility. It is conventionally known that biosignal-based biometrics can have unique features for each individual. For example, because everybody has different brain configurations, spontaneous electroencephalograms (EEGs) between subjects are different. Therefore there is a high inter-subject variability. A similar phenomenon has been observed for ECG as heart electrical characteristics, heart rate, rhythm and morphology vary between subjects. For example, Kyoso et al. (Proceedings of the 23rd Annual International Conference of the IEEE, Vol. 4, pp. 3721-3723, 2001) compare a patients electrocardiogram (ECG) with previously registered ECG feature parameters for purposes of identification. Despite the inter-individual ECG and EEG variability that allows their use as a biometric identifier, their intra-individual variability, which involves signal variations for the same subject, limits their robustness.

Thus, a need exists for a system for identity recognition that is at least one of more reliable, robust, hard to deceive (on-line and off-line), low cost and user-friendly. There is a need for an identity recognition system that may be used in stand-alone applications or integrated with existing security systems.

SUMMARY

Some embodiments provide a biometric authentication system including: headwear including a plurality of biosensors each configured to sample muscle activity so as to obtain a respective time-varying signal; a data store for storing a data set representing characteristic muscle activity for one or more users; and a processor configured to: process the time-varying signals from the biosensors in dependence on the stored data set so as to determine a correspondence between the time-varying signals and the characteristic muscle activity of one of the one or more users, and in dependence on the determined correspondence, authenticate the time-varying signals as being associated with that user.

The biosensors may be located on the headwear such that, in use, the biosensors are configured to detect muscle activity of a predetermined plurality of facial muscles. The predetermined plurality of facial muscles may include a muscle that is involuntarily co-contracted in at least one facial expression. The predetermined plurality of facial muscles may include corresponding muscles from each side of a user's face, and the processor may be configured to determine a measure of asymmetry in the muscle activity of the corresponding muscles.

Suitably the data set includes a stored time-varying signal, and the processor is configured to process the time-varying signals in dependence on the stored data set by comparing the time-varying signals to the stored time-varying signal. Suitably the data set includes one or more stored signal features, and the processor is configured to process the time-varying signals in dependence on the stored data set by comparing one or more signal features of the time-varying signals to the one or more stored signal features.

Suitably the processor is configured to determine whether a threshold number of signal features of the time-varying signals correspond to the one or more stored signal features. Suitably the one or more stored signal features is determined in dependence on a previously-recorded time-varying signal. Suitably the processor is configured to determine that a signal feature of the time-varying signals corresponds to a stored signal feature where the respective signal features are within a predetermined tolerance of one another. Suitably the processor is configured to determine that a signal feature of the time-varying signals corresponds to a stored signal feature where the signal feature exceeds a threshold value for that signal feature determined in dependence on the stored signal feature.

Suitably the biometric authentication system is configured to determine a first authentication level in dependence on determining that a first threshold number of signal features corresponds to the one or more stored signal features, and to determine a second authentication level in dependence on determining that a second threshold number of signal features corresponds to the one or more stored signal features, where the second threshold number is greater than the first threshold number, the second authentication level permitting authentication of the user to a higher security level. Suitably the biometric authentication system is configured to determine a first authentication level in dependence on determining that the respective signal features are within a first tolerance of one another, and to determine a second authentication level in dependence on determining that the respective signal features are within a second tolerance of one another, where the second tolerance is smaller than the first tolerance, the second authentication level permitting authentication of the user to a higher security level.

Suitably the characteristic muscle activity represented by the data set includes a measure of one or more of: an amplitude of at least one of the time-varying signals; a variation with time of the amplitude of at least one of the time-varying signals; a measure of asymmetry in the electrical muscle activity of corresponding muscles from each side of a user's face; and the timing of activation of at least one facial muscle, relative to a common time base or to the timing of activation of at least one other facial muscle.

Suitably the processor is configured to determine the correspondence between the time-varying signals and the characteristic muscle activity by at least one of: applying a pattern recognition algorithm; and applying an analysis of variance test.

Suitably the processor is configured to process the time-varying signals to obtain a plurality of representative values of the time-varying signals, the data set including a plurality of stored representative values, the representative values and the stored representative values being generated by a pre-defined algorithm, wherein the processor is configured to compare the representative values to the stored representative values.

Suitably the processor is configured to compare the time-varying signals to the stored time-varying signal by determining whether the signals are within a predetermined tolerance of one another.

Suitably the biosensors include one or more electric potential sensors. Suitably the electric potential sensors are dry contact electric potential sensors. Suitably the headwear includes sensors for determining a user's gaze. Suitably the processor is configured to process the time-varying signal by at least one of: clipping the signal; signal denoising; applying a signal baseline correction; using onset detection; using data segmentation; applying a log-transform; and extracting one or more features from the signal. Suitably the processor is configured to use onset detection by applying thresholding to the signal. Suitably the processor is configured to denoise the signal by at least one of: signal filtering; signal conditioning; and signal smoothing. Suitably the processor is configured to filter the signal by at least one of: applying a notch filter; and applying a band-pass filter.

Suitably the processor is configured to construct a model for pattern recognition. Suitably the processor is configured to train the model by a machine learning algorithm. Suitably the machine learning algorithm includes a kernel machine. Suitably the kernel machine includes one or more of a Support Vector Machine (SVM), a neural network, a discriminant analysis method and a k nearest-neighbour (KNN) method.

The sampled muscle activity may be electrical muscle activity and the stored data set may include characteristic electrical muscle activity for one or more users.

The plurality of biosensors may include one or more of EMG sensors and optical sensors.

Suitably one or more of the plurality of biosensors are optical sensors configured to capture a series of images of an area of skin of a user so as to obtain a time-varying signal characteristic of the area of skin imaged in the captured series of images; the data store is configured for storing a further data set representing skin characteristics for the one or more users; and the processor is configured to process the image signal in dependence on the stored further data set so as to determine a correspondence between the image signal and the skin characteristics for the one or more users, and in dependence on the determined correspondence, to authenticate the image signal as being associated with one of the one or more users.

Suitably the system is configured to output an authentication signal for controlling access to a resource.

Some other embodiments provide a method for authenticating a user of headwear, the headwear including a plurality of biosensors configured to sample muscle activity, the method including: sampling, using each of the plurality of biosensors, muscle activity of the user to obtain a respective time-varying signal; processing the time-varying signals from the biosensors in dependence on a data set representing characteristic muscle activity for one or more users so as to determine a correspondence between the time-varying signals and the characteristic muscle activity of one of the one or more users; and in dependence on the determined correspondence, authenticating the time-varying signals as being associated with that user.

Suitably the step of sampling muscle activity of the user includes sampling muscle activity as the user performs one or more facial expressions. Suitably the method includes generating a signal to cause a user to perform a predetermined sequence of one or more facial expressions.

Some other embodiments provide a biometric authentication system including: headwear including an optical sensor configured to capture a series of images of an area of skin of a user so as to obtain an image signal characteristic of the area of skin imaged in the captured series of images; a data store for storing a data set representing skin characteristics for one or more users; and a processor configured to: process the image signal in dependence on the stored data set so as to determine a correspondence between the image signal and the skin characteristics of one of the one or more users, and in dependence on the determined correspondence, authenticate the image signal as being associated with that user.

Some other embodiments provide a method for authenticating a user of headwear, the headwear including an optical sensor configured to capture a series of images of an area of skin of a user, the method including: capturing, using the optical sensor, a series of images of an area of skin of the user to obtain an image signal characteristic of the area of skin imaged in the captured series of images; processing the image signal in dependence on a data set representing skin characteristics for one or more users so as to determine a correspondence between the image signal and the skin characteristics of one of the one or more users; and in dependence on the determined correspondence, authenticating the image signal as being associated with that user.

Suitably the step of capturing the series of images of an area of skin of the user includes capturing the series of images as the user performs one or more facial expressions. Suitably the method includes generating a signal to cause a user to perform a predetermined sequence of one or more facial expressions. Suitably the method includes processing the captured series of images so as to generate a composite image where the composite image images an area of skin larger than an area imaged in a single image of the captured series of images.

Some other embodiments provide a biometric authentication system including: headwear including a plurality of biosensors each configured to sample a facial biosignal so as to obtain a respective time-varying signal; a data store for storing a data set representing facial biosignal characteristics for one or more users; and a processor configured to: process the time-varying signals from the biosensors in dependence on the stored data set so as to determine a correspondence between the time-varying signals and the facial biosignal characteristics of one of the one or more users, and in dependence on the determined correspondence, authenticate the time-varying signals as being associated with that user.

Suitably the time-varying signals include data representing at least one of: electrical muscle activity; and a series of images of an area of skin. Suitably the series of images of the area of skin includes one or both of: a series of overlapping and/or abutting images permitting generation of a static image including a composite image formed from a plurality of images in the series of images; and a dynamic image including information on how at least a portion of the imaged area of skin changes through the series of images.

The headwear may further include one or more proximity sensors arranged to, in use, measure distance between the headwear and the user's head, and the processor may be configured to process the time-varying signals from the biosensors when the distance between the headwear and the user's head as measured by the first proximity sensors is within predefined bounds indicating that the headwear is correctly positioned on the user's head.

The data set may further include information representing the predefined bounds for at least some of the one or more users.

The headwear may be a pair of glasses and the one or more proximity sensors may include a proximity sensor at a nose bridge of the glasses which, in use, is arranged to measure a distance between the glasses and the skin overlying the glabellar muscle of the user.

The headwear may be a pair of glasses and the one or more proximity sensors may include at least one proximity sensor at the distal end of the arms of the glasses which, in use, is arranged to measure a distance between the glasses and post-auricular skin overlying the ear.

Any feature of any aspect above can be combined with any one or more features of any other aspect. Method features can be rewritten as apparatus features, and vice versa. These have not been written out in full here merely for the sake of brevity.

BRIEF DESCRIPTION OF THE DRAWINGS

Some embodiments of the presently disclosed subject matter will now be described by way of example with reference to the accompanying drawings. In the drawings:

FIG. 4B illustrates an interface between the headwear and another device;

DETAILED DESCRIPTION

Figure 1:
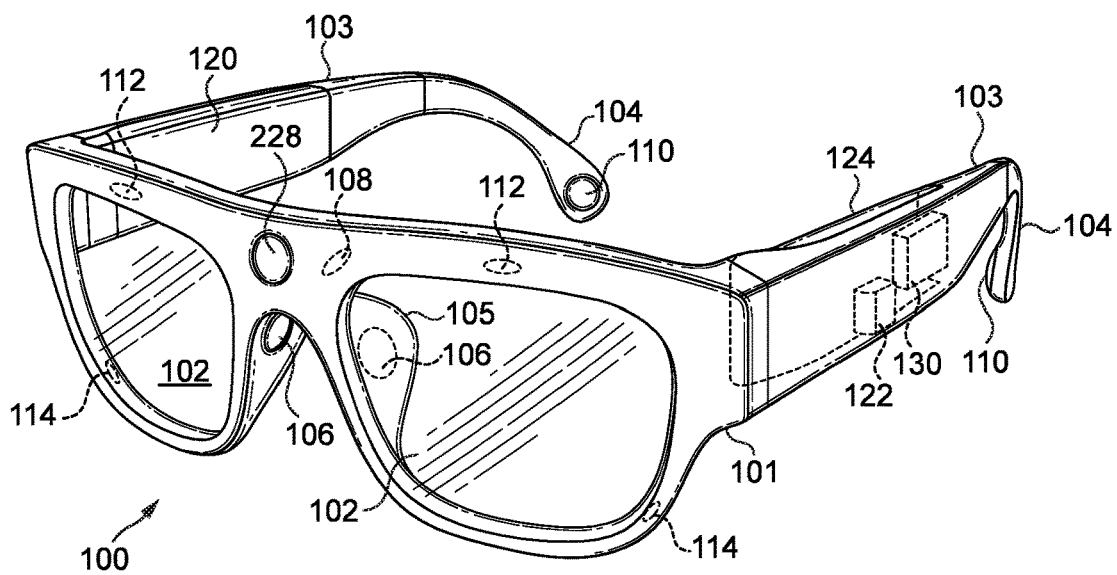
FIG. 1 is an illustration of headwear embodied in a pair of glasses.

The following description is presented by way of example to enable a person of ordinary skill in the art to make and use some embodiments. The presently disclosed subject matter is not limited to the embodiments described herein and various modifications to the disclosed embodiments will be apparent to those with ordinary skill in the art.

The general principles defined herein may be applied to other embodiments and applications without departing from the spirit and scope of some embodiments. Thus, some embodiments are not intended to be limited to the embodiments shown, but is to be accorded the widest scope consistent with the principles and features disclosed herein.

Unless the context may otherwise require, throughout the specification and claims which follow, the word "comprise" or "include" and variations thereof, such as, "comprises" or "includes" and "comprising" or "including" are to be construed in an open, inclusive sense, that is as "including, but not limited to." Unless otherwise defined, all or most scientific and technical terms used below have the same meaning as commonly understood by a person of ordinary skill in the art.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references unless the context clearly dictates otherwise. The meaning of "in" includes "in" and "on."

The term "authentication signal" as used herein refers to the signal sent by the biometric device to an access point which may be a physical access, an augmented reality access or access to a computer-based environment. The authentication signal may be a binary encoded sequence transmitted by wireless transmitter, such as a wireless protocol, or wired component, such as a cable or electrical wire.

As used herein, the terms set and subset refer to one or more items.

Human-computer interactions can be made more secure by the addition of a layer to augment existing password-based methods. Biosignal-based biometrics is a generation of physiology- and behavioural-based identity recognition modalities with a very high level of security and is particularly suited to wearable technology.

Biometric technology provides a reliable security system for identity verification and recognition of individuals based on their inherent characteristics in both modes of identification and verification or authentication. The human features can include physiological or behavioural traits. Physiological features include face, iris, and fingerprints whereas keystroke dynamics, gait and voice/speech are behavioural features. However, these modalities are not robust enough against falsification. Some instances of attacks in biometric security systems involve the use of latex for re-creation of a fingerprint, voice imitation and the application of contact lenses copied from original iris features. In other instances, authentication methods may be violated by 'over the shoulder' snooping whereby a passcode, password or gesture is observed secretly. Therefore it is advantageous if the method of authentication is discreet. In the case of virtual reality, where a virtual reality headset may be worn, the headset may obscure movements of upper facial muscles such as occur when winking or blinking. However these gestures would be likely to be visible in a social virtual reality situation, or may be read or inferred from the data transmitted from headset sensors. Therefore a method of ensuring that the authentication code is can be only known to the user would be a great advantage.

Face recognition systems may be spoofed by use of photographs or videos of the target face. Leviticus taught that a biometric system for access control may be triggered by movement (US 2015/0278499 A1), but this system may still be spoofed by a hacker wearing a mask. Yicong and colleagues (US 20160071111) taught that a facial gesture may be used for authentication by computer vision, and specified that more than one camera should be used and an expression such as a wink could be used which might make the system more secure. However, this method still may be spoofed by the use of disguise and advanced make-up techniques.

Biosignal-based biometrics is a new generation of behavioural biometric identity recognition modalities which has been introduced extensively during the last decades. The biosignal of an individual is highly secured and personal. Therefore, it is hard to mimic and counterfeit. Current biosignal-based biometrics mainly work using ECG and EEG. For instance, ECG signals may be used to evaluate or profile an individual's physiological and cognitive state. Directly or remotely acquired ECG signals may be used to identify a subject.

A critical drawback of existing biometric identification systems is the signal recording. To record an ECG with good quality, electrodes should be placed on the subject chest which makes it difficult to use for public applications. Moreover, intra-individual (or intra-subject) variability, which involves signal variations for the same subject, is another issue. ECG biometric readings taken in the presence of cardiac disorders still present an issue with variabilities that are higher than desired. An ECG-based identification system would need to be invariant to such physiological conditions, amongst others. ECG-based biometrics are sensitive to the subject's internal emotions (mood) as well as physical conditions due to activation of the sympathetic nervous system. Further, the ECG signal, as it can be recorded from a conductive contact without the individual's knowledge, may be retransmitted to spoof a security system. EEG recording for accurate, reproducible results is also difficult as it may require experts to put the electrodes over particular positions on the scalp.

In addition to the mentioned problems, one of the important drawbacks in all or most previously proposed biosignal-based biometrics is the low level of flexibility. It is not possible to change a subject's biometric characteristic or even to increase the number of the subject's characteristics. This could be a problem if we consider many systems with different levels of security. The corruption of a system with a low level of security could help an attacker to gain access to a system with a higher level of security. Besides, unlike passwords, a subject cannot change their fingerprint, ECG, or EEG. These problems can be addressed by using a biometric with a high flexibility.

As discussed in examples below, an approach based on biosignals derived from a subject's face would be a highly flexible method for biometric security systems as it is difficult to spoof, unlike image-based systems. In examples below a system requiring a user to perform a facial expression or sequence of facial expressions for personal identification and/or authentication is described. In this technology, superficial muscle activities produced by different facial expressions are recorded, for example through surface electrodes. Then, a series of biosignal processing techniques and machine learning algorithms can be implemented to analyse the data. The process reliably identifies and verifies the user. This process is very robust against falsification.

The facial biosignal approach may be based on electrical characteristics associated with facial muscles, such as electrical muscle activity. The electrical muscle activity is suitably characteristic electrical muscle activity associated with one or more facial expressions or facial gestures. Such electrical muscle activity can, for example, be determined from electromyography (EMG). The muscle activity may also be measured indirectly by measuring the activation of the muscle of interest.

Electromyography is an electrophysiological technique for evaluating and recording physiological properties of muscles at rest and while contracting. EMG is performed using a device called an electromyograph, to produce a record called an electromyogram. An electromyograph detects the electrical potential generated by muscle cells when these cells contract, and also when the cells are at rest. The electrical source is the muscle membrane potential, which is about −70 mV. Depending on the method used, the resulting measured potentials range typically between less than about 50 µV to about 30 mV. Amplitudes of EMG signals typically range between 0 and 10 mV (peak-to-peak), or 0 and 1.5 mV (RMS). The frequency of the EMG signal is typically between 0 and 500 Hz. The usable energy of EMG signals is typically dominant between 50 and 150 Hz.

EMG is a good technique for distinguishing between different subjects for several reasons. The motor unit firing pattern, motor unit recruitment order and characteristics of the muscles change from person to person, and therefore electromyograms (EMGs) can be used for identifying a person. The characteristics of EMG signals are different even though the appearances of gestures might look identical between two subjects (people). EMG measurements are influenced by one or more of the muscle fibre pattern, motor unit discharge pattern, differences in blood flow, neural activity, and neurotransmitter activity within the muscle, skin conductivity, position, shape and size of the muscle, development of muscle, motor unit paths, differing bone densities, distribution of heat in the muscle, skin-fat layer, and gesture style. These factors make biosignal-based identification and authentication difficult to spoof.

Unlike conventional biometric modalities, the bioelectrical signals are highly confidential and personal to an individual and therefore difficult to forge.

Systems for determining electrical muscle activity, such as EMG systems, can therefore be used to reduce the effects of at least some of the drawbacks mentioned above in the context of conventional systems.

Facial EMG-based systems offer highly flexible biometric approaches for both individual identification and security systems. The facial EMG-based biometric technology might be applied in government and commercial environments, secure public and travel documents, health monitoring systems, forensic systems (including identifying criminals and law enforcement) and distributed systems such as smart cards and/or many others, including for example gaming systems for profile selection. A facial expression can lead to the generation of particular electrical muscle activity (i.e. related to that facial expression, such as characteristic activity of muscles used in pulling the particular facial expression), which can be used to identify and/or authorise an individual. A sequence of facial expressions will provide even better security since this would lead to the generation of particular electrical muscle activity of greater complexity. The greater the number of expressions, the greater the complexity, and the greater the security.

The present techniques are based on measuring biosignals from the face. As an exemplar we describe EMG, however other biosignals measurable from the face may be used including but not limited to ECG, electrooculography (EOG), EEG, optical image signals or a combination of these with or without other data from sensor modalities such as information from proximity sensors and/or contact sensors. For example, EMG and EOG can be used in combination with one another. Such a combination of techniques can provide greater flexibility and/or enhanced security.

There are several issues that must or should be considered when investigating whether a feature is suitable for use as a biometric. These are discussed below in the context of electrical muscle activity, with EMG as an example of determining such electrical muscle activity.

Figure 7:
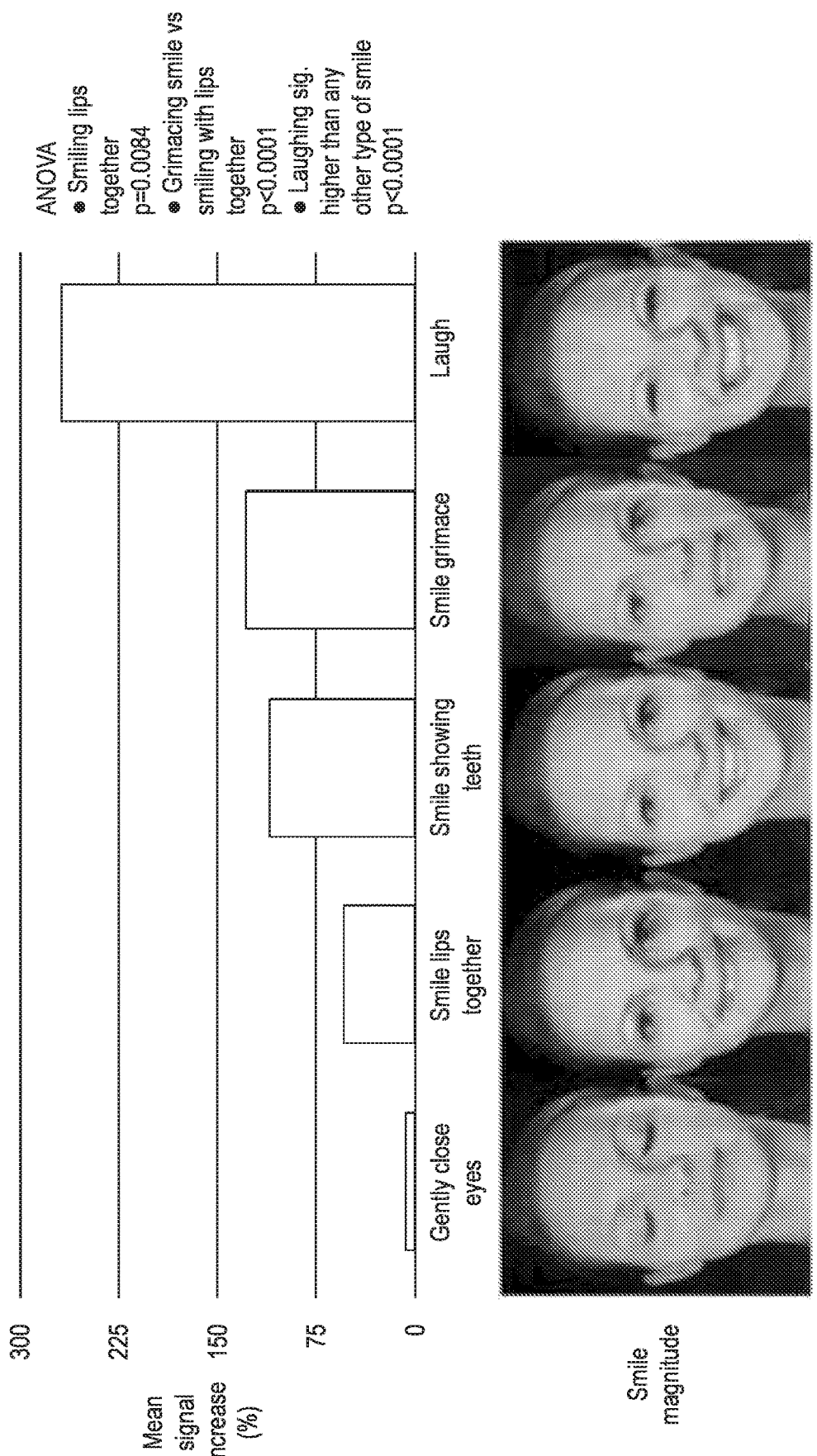
FIG. 7 illustrates proportional co-activation of the posterior auricular muscle with certain expressions (smiling)

Reproducibility—a feature should be highly reproducible for use as a biometric. Facial expressions or gestures can be reproduced by an individual due to the consistent muscle origins and insertion points on the face. Further, the present techniques utilise the fact that facial gestures and expressions exhibit certain stereotyped behaviours. In particular, unilateral expressions, such as an eye wink, are accompanied by involuntary co-contractions of one or more additional muscle or muscle group. For example, in the case of an eye wink, there is a co-contraction of the opposite frontalis muscle to maintain opening of the opposite eye. Force contractions tend to create "overflow" effects whereby non-target muscles are recruited as part of the target activation. For example forced eye closure recruits the zygomaticus muscle of the cheek, which in turn leads to co-contraction of the peri auricular muscles (FIG. 7). These co-contractions are also reproducible. In terms of security, the sensor outputs resulting from such unilateral voluntary expressions are harder to replicate.

Stability over time—a feature should be highly stable over time for use as a biometric. Slowly-varying features may be used, where the slow time variation can be taken into account (for example as part of a machine learning process). For example a skin patch measured with an optical sensor may change slowly, but remain consistent enough between uses on a daily basis such that the system can be regularly updated. However, features that vary quickly are less suitable since the higher variability would be likely to mean that the same individual might not be recognised as such.

Controllability—a feature should be highly controllable for use as a biometric, since it is desirable that the feature can be obtained as and when desired. Unlike EEG signals facial gestures are at least partially under easy voluntary control, and so a good candidate for use as a biometric.

Subject presence—a feature should be highly indicative of the presence of a live subject, in person. Biosignal-based biometrics have this benefit.

Universality—a feature or biometric characteristic should be universally applicable. Biosignal-based biometrics have this benefit. It is possible to obtain signals from people who are alive.

Uniqueness—a feature should preferably or advantageously be unique for use as a biometric. The biometric characteristic should be able to unequivocally identify the individual(s) within the target population. Regarding facial muscle activity, the motor unit firing pattern, motor unit recruitment order and/or characteristics of muscles such as size, location, movement pattern, origin and insertion point) changes from person to person, and therefore can suitably be used for identifying a person.

Collectability—a feature or biometric characteristic should be quantitatively measurable. Glasses based biometrics have this benefit given their wide use.

Acceptability—Glasses are the most popular wearable

Flexibility—Unlike ECG- and EEG-based biometrics, facial EMG provides a flexible biometric as it is possible to change the biometric characteristic to set different levels of security, for example by combining different facial expressions in one or more sequence. Fingerprint data, ECG data, and EEG data cannot be easily changed at will, but it is possible to produce different facial expressions, alone or in combination with other facial expressions, easily.

The above discussion shows that electrical muscle activity of facial muscles is a suitable candidate for a biometric for distinguishing between subjects.

Figure 2A:
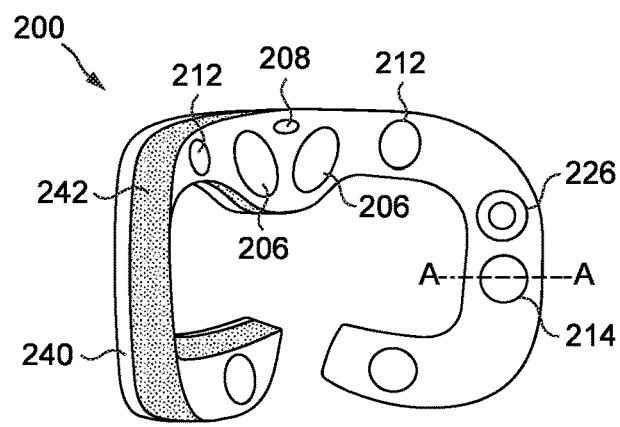
FIG. 2A is an illustration of headwear embodied in a headset.

In order to reliably perform biometric identification based on facial muscle activity of a subject, one or more biosensors, such as surface electrodes or imaging sensors, may be positioned at a known location in the vicinity of the muscles to be activated. This can be achieved by mounting the sensors to, or embedding the sensors in, a head-mounted device or headwear such as one or more of a helmet, mask, balaclava, or eyewear, for example in the style of goggles, glasses, sunglasses, protective eye shields and so on. Alternatively or additionally the sensors may be mounted in or on a headset, for example an audio headset including earphones (such as for listening to music or making telephone calls) an ear-mounted device such as headphones, earbuds or a telecommunication device. In this case the sensors can suitably be activated by pericranial muscles. The latter includes, but is not limited to, posterior auricular, superior auricular, anterior auricular muscles, the temporalis muscle, masseter and occipital muscles. Suitably, "headwear", includes any wearable device that in use at least partly overlies facial muscles of the user. FIGS. 1 and 2 show example configurations for a glasses-mounted system (FIG. 1) and a goggle (or virtual reality)-mounted system (FIG. 2A). These will be described in more detail below.

The use of a system based on headwear or facewear, and which may be incorporated into glasses, goggles or other facewear, is particularly advantageous for Virtual Reality (VR) and augmented reality uses.

Biosensors suitable for use as EMG electrodes may be standard wet (e.g. silver chloride gel) electrodes with adhesive pads, or dry electrodes. The latter may be resistive electrodes or capacitive electrodes which in either case may present metallic, conductive fabric or conductive silastic or rubber coated exterior surfaces for contact with a subject. The sensors can suitably be electric potential sensors (e.g. a Plessey EPIC sensor) and/or surface EMG (sEMG) sensors (e.g. contact sensors manufactured by mc10 or Toumaz), and are suitably configured to detect electrical activity of muscles. Preferably or advantageously the sensors are electric potential sensors because these exhibit high sensitivity and may not require a conductive medium such as a gel or conductive adhesive patch to electrically couple the sensor to the skin. The sensors can include dry contact electric potential sensors. Muscle activity may alternatively or additionally be detected from the motion of the skin overlying the muscle using a body-worn imaging sensor. A combination of types of sensor can be used.

In the example illustrated in FIG. 1, the headwear is a pair of glasses 100. The glasses 100 include a frame body 101 supporting a pair of lenses 102 in any suitable configuration. The lenses 102 could be made of any suitable material, including glass and plastic (such as polycarbonate). The lenses 102 may be prescription lenses. The glasses include two arms 103 extending from the frame body to the earpieces 104 which are configured to hold the glasses in place at or around the ears of a user. The arms could form a single piece with the frame body, or the arms could be foldable towards the frame body so as to allow the glasses to be stored more compactly. The glasses also include a nosepiece or nosepieces 105 so as to allow the glasses to sit comfortably at the nose of the user.

The glasses 100 include a set of biosensors for detecting the facial muscle activity of a user. By arranging the biosensors at particular points on the glasses, the activity of different facial muscles can be detected, such as a predetermined plurality of facial muscles. The biosensors, and additional components of the glasses 100, are schematically illustrated in FIG. 1. For example, biosensors 106, 108 (such as electric potential sensors) could be provided at nosepiece(s) 105 such that, when the glasses are worn, the biosensors engage with one or more of the glabellar and/or frontalis muscles (preferably or advantageously by a biosensor 108) and nasalis muscles (preferably or advantageously by biosensors 106). In the example illustrated in FIG. 1, one biosensor 108 is provided for sensing the glabellar and/or frontalis muscles. In other examples, one or more additional such biosensor may be provided. Additionally or alternatively, biosensors 110 (such as dry electrode expression sensors) could be provided at the earpieces 104 (i.e. at or towards the distal ends of the arms of the glasses) such that, when the glasses are worn, these biosensors engage with one or more of the anterior auricular, superior auricular and posterior auricular muscles. Additionally or alternatively, biosensors 112 could be provided at the frame body 101 to allow the activity of the orbicularis oculi muscles to be detected. Additionally or alternatively, biosensors can be provided on the supporting arms of the glasses and arranged, in use, for detecting the activity of the temporalis and/or masseter muscles. Optical or other kinds of biosensors 114, arranged for detecting electrical activity in, or changes in the topology of, the zygomaticus and/or levator labii muscle, can additionally or alternatively be provided. Optical biosensors will be described in more detail below. There could be more than one biosensor and optionally more than one type of biosensor at each of the exemplary locations shown in FIGS. 1 and 2A.

The glasses illustrated in FIG. 1 are portable headwear for detecting the activity of one or more muscle or group of muscles. To power the biosensors a battery 120 is provided. The battery 120 may be replaceable and/or rechargeable. For example, the battery 120 may be a 12 hour rechargeable battery. A port 122 is suitably provided for recharging the battery. The glasses, as illustrated in the example shown in FIG. 1, are provided with a data acquisition system 124 for acquiring data from the biosensors. The glasses are suitably also provided with a data processing system, though this may not be necessary in all or most examples. Suitably, where the data processing system is provided at the glasses, the data processing system is provided together with, or as part of, the data acquisition system 124. Suitably, the glasses are provided with a high quality data acquisition and processing system 124. The glasses may include a data store for storing a data set representing characteristic muscle activity for one or more users. Suitably, the data store is provided at or adjacent the data acquisition system 124. Suitably, the battery 120 and data acquisition system 124 are provided in the arms of the glasses. This can aid the weight distribution within the glasses frame and make the glasses more comfortable to wear. In other examples, the battery 120 and data acquisition system 124 can be provided at any suitable location in the glasses frame 100.

The port 122 is suitably a combined power and data port, for example a USB port such as a micro-USB port. Where the battery 120 is not rechargeable, the port 122 may be a data-only port. The port 122 thus permits data to be transferred to and from the glasses 100. Data generated by the biosensors may thus be transferred from the glasses 100 to another device, as will be discussed later. Data may also usefully be transferred to the glasses 100. For example, where the glasses 100 include a data processing system, the data processing system will suitably include logic and/or processing algorithms for processing data. This logic and/or these algorithms are suitably programmable and/or updateable through a wired data connection made via the port 122. Additionally and/or alternatively to the data port 122, the glasses 100 suitably include a wireless module 130 for connecting the glasses 100 wirelessly to another device. Suitably the wireless module includes a Bluetooth module, for example a Bluetooth module configured to operate according to the Bluetooth LE (low energy) wireless protocol. Suitably the wireless module 130 includes a dual mode Bluetooth module. Other types of modules and/or wireless protocols, such as other Bluetooth protocols and Wi-Fi, are possible. Bluetooth LE is particularly suitable due to its low power requirements that may be necessary. Typically the other device with which the glasses 100 are to communicate wirelessly will be well within the range of Bluetooth LE. This can also aid data security by restricting the broadcast of the data to within the range supported by Bluetooth LE. Use of a low energy protocol can assist in advantageously prolonging the life of the battery 120.

In another example, as illustrated in FIG. 2A, the headwear can be embodied in a headset such as a virtual reality headset 200. Biosensors, for example one or more biosensor as described in connection with FIG. 1, can suitably be provided at the headset 200. For example a biosensor or a pair of biosensors 206 can be provided at a low front central portion for engaging, in use, with the nasalis muscles. A biosensor 208 can be provided at the front centre of the headset for engaging with one or more of the glabellar and frontalis muscles. One or more biosensor 212 can be provided above a region provided for a lens or screen for allowing the activity of the orbicularis oculi muscles to be detected. One or more biosensor 214 can be provided at a side portion of the headset for detecting electrical activity in, or changes in the topology of, the zygomaticus and/or levator labii muscle. It will be understood that these biosensors can be provided in any suitable combination in the glasses 100 and/or the headset 200.

The glasses 100 and/or the headset 200 may also include a heart rate monitor 226 (as illustrated in FIG. 2A) and/or a motion sensor 228 (as illustrated in FIG. 1). The motion sensor 228 may include an inertial measurement unit. The motion sensor may include an accelerometer, such as a 6-axis accelerometer. The motion sensor may include a gyroscope. Additional sensors and/or types of sensors may also be provided to permit the capture of data in addition to the electrical muscle activity of a facial muscle. Such additional data can be used to enhance the use of the data as biometric data, as will be further described below.

Referring again to the example illustrated in FIG. 2A, the headset 200 includes a thin, flexible support 240. The support may be 3D printed for ease of construction. The support 240 suitably supports a material layer 242. The material layer is suitably a layer of foam 242 or other soft or padded material. This construction permits the headset 200 to be lightweight. The soft or padded material 242 aids comfort when the headset is worn against the face of a user. The material layer 242 suitably has a laser cut profile. The flexibility of the support 240 aids in conforming the headset 200 to the user's face. The support 240 need not be flexible in all or most examples.

Figure 2B:
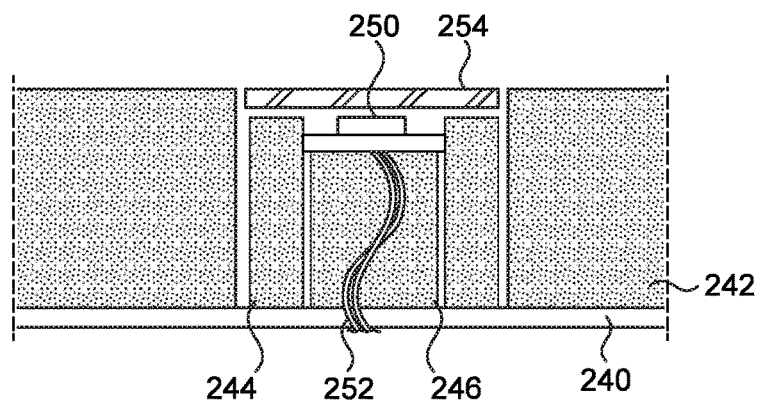
FIG. 2B is a sectional view along line A-A in FIG. 2A.

FIG. 2B illustrates a section through the headset 200 along the line A-A in FIG. 2A. The foam 242 or other padding is provided on the support 240. The material layer 242 suitably includes insert portions 244, 246. The insert portions can be used to support the sensor 250. Suitably the insert portions are of a different thickness to the bulk of the material layer 242, for example as illustrated in FIG. 2B. A biosensor 250 is provided on a foam portion 246 which is of a reduced thickness compared to the bulk of the foam 242 such that the sensor 250 is recessed from the front surface of the bulk of the foam 242. The sensor 250 is coupled to the data acquisition system (not shown in FIG. 2B) by any suitable coupler, for example conductive wires 252. A layer 254 is provided over the sensor 250 to act as a protective cover. The layer is suitably a conductive material such as a conductive rubber. Suitably the exposed (front) surface of the layer 254 (i.e. the surface which will come into contact with the face of a user when the headset 200 is being used) is flush, or substantially flush, with the exposed (front) surface of the bulk of the foam 242. In some examples, the surface of the layer 254 may be slightly proud of the surface of the bulk of the foam, i.e. it may protrude slightly from the surface of the bulk of the foam. This can assist in ensuring that the layer 254, and hence the sensor 250, makes good contact with the face of the user when the headset 200 is in use. In some examples, the bulk of the foam 242 is more compressible than the portion of the headset 200 that houses the sensor 250, such that as the headset 200 is pressed against the face of a user, the relatively greater compression of the bulk of the foam assists in providing a good contact between the sensor 250 (via the layer 254) and the face of the user.

Comparing the examples illustrated in FIGS. 1 and 2A, the glasses 100 may have, in some examples, fewer sensors than the headset 200. This is because the glasses 100 are typically worn by a user with a greater positional repeatability (i.e. the glasses 100 will typically fit a user's head more closely than the headset 200 and so will better align with the same position on the user's head each time they are worn). This can increase the accuracy with which the sensors are located adjacent one or more muscle group, and so reduce the overall number of sensors needed on the headwear to be able to obtain sufficient accurate data for use in a biometric system.

In the example shown in FIG. 1, the arms 103 of the glasses 100 are preferably or advantageously foldable and the headwear is suitably configured to become enabled for use (e.g. power up) on the arms being unfolded into positions in which the glasses can be worn by the user. This can be achieved through the use of switches at the hinges (not shown) between the frame body and arms, and can help to conserve battery power at the device.

For headwear such as a face-worn device including a nosepiece such as the glasses 100 and/or the headset 200, it can be advantageous to provide a proximity sensor at the bridge of the nosepiece (of the glasses 100) or at a portion of a rim (of the headset 200) in order to detect when the headwear is removed by the user. On the proximity sensor detecting that the headwear has been removed (e.g. when the distance to the skin measured by the proximity detector exceeds some predetermined threshold), at least some parts of the device may be configured to enter a sleep state. Optionally one or more sensor and/or the data acquisition system may enter a sleep state. Optionally the data processor may enter a sleep state. Additionally or alternatively, the headwear is suitably configured to switch between a low power mode and an operating mode in dependence on whether signals from a plurality of the biosensors indicate that the headwear is being worn.

The headwear may therefore provide a convenient and accurate system for detecting facial muscle activity such as electrical facial muscle activity which can be provided as a low power, portable system that can be used whilst the user is moving about.

The glasses shown in FIG. 1 and the headset shown in FIG. 2A are merely schematic and it is to be understood that the shape, style, size and fit of the glasses/headset may vary so as to allow the biosensors to engage with the facial muscles of a given user in the manner described herein. Preferably or advantageously the glasses would be fitted by a healthcare professional or optician so as to ensure optimal engagement of the biosensors with the muscles of the user. Similarly, the headset is preferably or advantageously tailored (for example, by being adjusted and/or manufactured) to suit the face of a user, for example by being 3D printed to match the facial contours of a user. This need not be the case in all or most examples.

Figure 3:
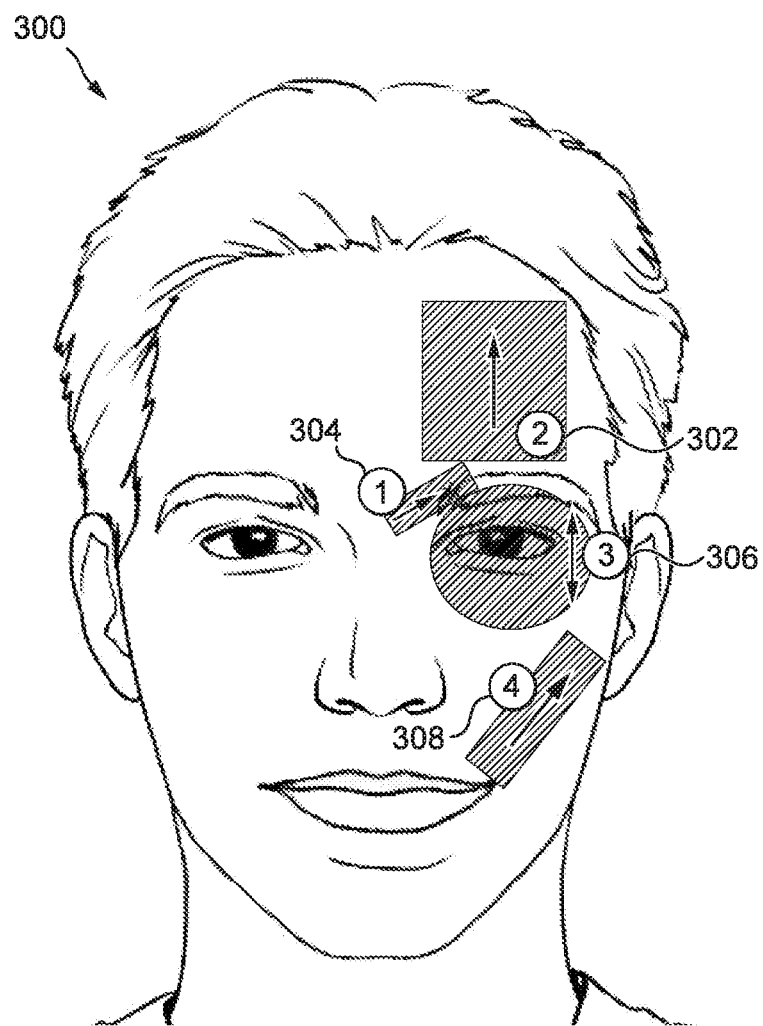
FIG. 3 illustrates possible sensor positions for facial biometric measurement.

FIG. 3 illustrates locations on the face of a user 300 at which muscles and/or groups of muscles can be found. At area 302, the frontalis muscle can cause a brow elevation movement. This movement is typically associated with surprise, fear and/or looking upwards. Data may be suitably obtained using an EMG sensor and a motion sensor such as an inertial measurement unit (IMU). Whether or not a user is looking upwards can be determined in dependence on the output from the motion sensor. For example, if the motion sensor indicates that the headwear has tilted upwards, this might indicate that the user is looking upwards, rather than showing surprise or fear. The heart rate monitor can also be used to distinguish between these cases; for example an elevated heart rate might indicate fear.

At area 304, the depressor supercilii, procerus, and/or corrugator supercilii muscles can cause a brow lowering movement associated with frowning, anger, concentration, pain, and/or a response to bright lights. A light sensor can be provided on the headwear in some examples. Data may be suitably obtained using an EMG sensor and optionally a light sensor. This can help to distinguish whether the muscle activity is in response to a bright light. Data may be obtained using a proximity sensor and/or a heart rate monitor. The heart rate monitor can be used to help assess whether the movement is due to a particular emotion, such as anger, since emotions can cause changes in the heart rate of a user.

At area 306, the orbicularis occuli muscle can cause a closing of the eye, blink and/or wink movements associated with blinking and/or winking, smiling and/or a fatigued expression. This muscle typically co-contracts with other facial muscles when a genuine smile is expressed. Data may be obtained using an EMG sensor.

At area 308, the zygomaticus major muscle can cause lifting of the corner of the mouth. This movement is associated with smiling, pain, a tight eye closure, winking and/or certain phonemes such as "ee". Data can be obtained using an EMG sensor and/or a proximity sensor.

In the above examples, a proximity sensor may be used to detect changes in the relative distance between the skin and the sensor. For example, when the skin wrinkles as part of a facial expression, a portion of the skin may move closer to (or further away from) the sensor.

Figure 4A:
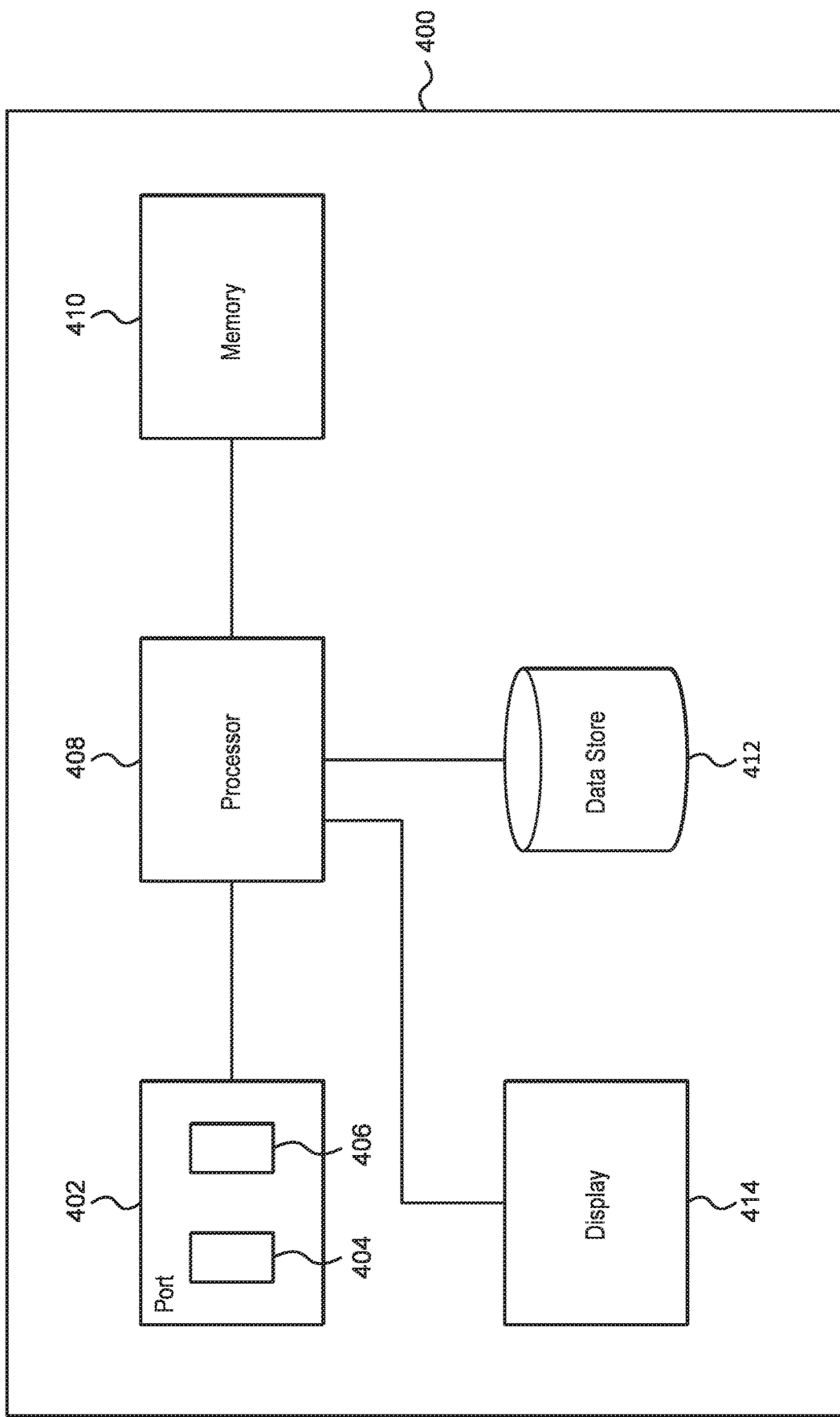
FIG. 4A illustrates a remote device for use with the headwear.

The headwear 100, 200 is suitably configured to couple to a remote device 400. The coupling may be by one or both of a wired and a wireless connection. The remote device suitably includes one or more of a smart watch, a smartphone, a PDA or other mobile electronic device and optionally one that includes a display, a laptop computer, a desktop computer and a server. The remote device may include a network access point for permitting onward communication with a further computing device. Referring to FIG. 4A, the remote device 400 suitably includes a communication port 402 for permitting communication between the remote device 400 and the headwear 100, 200.

The port 402 is coupled to a processor 408. Also coupled to the processor are a memory 410, a data store 412 and optionally also a display 414.

Suitably the port 402 permits bidirectional communication. In some examples, more than one port can be provided. The port 402 suitably includes one or both of a wired connection module 404 and a wireless connection module 406 (both are illustrated in FIG. 4, though both modules need not be present in all or most examples). The wired connection module 404 can, for example, include a USB port. The wireless connection module 406 can, for example, include a Bluetooth module such as a module configured to communicate using the Bluetooth LE protocol. Preferably or advantageously, the headwear 100, 200 includes a Bluetooth module and the remote device 400 includes a Bluetooth module, permitting the headwear and the remote device to communicate with one another wirelessly using the Bluetooth protocol.

The memory 410 suitably includes a volatile memory and can be used to store processing algorithms and/or start-up routines for the remote device 400. In some examples the memory 410 includes a non-volatile memory in addition or alternatively to the volatile memory. It is preferable or advantageous for the remote device 400 to include a volatile memory to permit the stored algorithms and/or start-up routines to be modified. Such modification can be achieved through a connection made via the port 402.

The data store 412 is configured to store a data set that represents characteristic electrical muscle activity for one or more user, so as to enable the one or more user to be identified and/or authenticated by reference to the stored data set. The data set is suitably caused to be stored at the data store 412 during an enrolment or configuration phase, as will be described below.

Thus, a biometric authentication system includes headwear 100, 200 and optionally also the remote device 400. Where the remote device is not present, the data processing may be carried out at the data processing system at the headwear. Where the remote device is present, the data processing may be carried out either at the data processing system at the headwear, at the remote device processor 408, or at a combination of the two.

The headwear 100, 200 may be connected to the remote device, such as a computer system, in order to provide information on facial muscle activity, such as electrical muscle activity, to the computer system. This could be for a range of purposes, including: for use in a virtual reality (VR) system (e.g. animating an avatar with the expressions made by the user of the device); to provide biometric security (e.g. performing a predefined series of facial expressions can be used to authenticate a user due to the unique pattern of muscle activations involved in creating such a series of expressions); for hands-free control (e.g. a user can provide input to a computer system through selective activation of their facial muscles).

Typically, the headwear would be coupled to a computer system by a driver interface 450 provided at the computer system. Dashed line 455 in FIG. 4B indicates a possible boundary between the headwear 100, 200 and the computer system. An application programming interface (API) 460 may be supported at the computer system so as to provide a convenient interface to other applications running at the computer system (e.g. games, VR software, and/or software for performing biometric authentication).

Data is captured or sensed by the biosensors at the headwear. Suitably, the biosensors may be configured to sample muscle activity to obtain a time-varying signal. Suitably the data includes the time-varying signal. The time-varying signal may be characteristic of the electrical muscle activity of one or more muscle or group of muscles, for example a muscle or muscle group which is, in use, near at least one of the biosensors. The 'raw' (i.e. unprocessed) time-varying signal can be stored at a data store at one or both of the headwear and the remote device. Suitably the data store stores a data set which represents characteristic muscle activity for a user (for example a user from a group of users). The data set can be a set of data which has been previously recorded by the biosensors, or a data set which includes data obtained in dependence on previously recorded data, such as average data of a plurality of previously recorded data or data extracted from previously recorded data. The data set might, in some examples, include a set of parameters representing the characteristic muscle activity, for example outputs from a machine learning model.

The characteristic muscle activity represented by the data set may include a measure of one or more of an amplitude of at least one of the time-varying signals, a variation with time of the amplitude of at least one of the time-varying signals, a measure of asymmetry in the electrical muscle activity of corresponding muscles from each side of a user's face, and the timing of activation of at least one facial muscle, relative to a common time base or to the timing of activation of at least one other facial muscle.

The time-varying signal can be processed by the processor at one or both of the headwear and the remote device. Suitably the processed time-varying signal is stored at one or both of the data store at the headwear and the remote device.

Since the raw time-varying signal is likely to may require a greater amount of storage than the processed time-varying signal, preferably or advantageously the processed time-varying signal is stored. The raw signal need not be stored. Where the remote device is present, suitably the processed time-varying signal is stored at the remote device data store 412. This approach reduces the amount of storage capacity needed at the headwear 100, 200, and so can reduce the cost and/or weight of the headwear.

In some examples, the raw signal can be processed at the headwear. This can be advantageous where the amount of data needed to represent the processed signal is less than the amount of data needed to represent the raw signal. This is because transferring the reduced amount of data over the wired or wireless connection can reduce the time taken, which means that an identification and/or authentication result can be obtained with a reduced delay, and/or reduce the power consumption of the headwear in transmitting this data, which means that the battery life of the headwear can be prolonged. This can be particularly advantageous where the signal processing can be performed at the headwear with a relatively low or minimal delay, and/or at a relatively low or minimal power cost.

Suitably, the time-varying signal can be processed at the remote device 400 if desired, whether or not it has been processed at the headwear. Thus, any computationally heavy processing (which is likely to may require additional resources and/or power) can be performed at the remote device 400 rather than at the headwear 100, 200. This can help optimise or reduce the overall time taken for the processing of the signal.

Suitably, the processor is configured to process the time-varying signal in dependence on the stored data set. This can permit determination of a correspondence between the time-varying signal and the characteristic muscle activity of the user. The processor can be configured to authenticate the time-varying signal as being associated with that user in dependence on the determined correspondence.

The biosensors can be located on the headwear such that, in use, they are configured to detect muscle activity of a predetermined plurality of facial muscles. The predetermined plurality of facial muscles can include a muscle that is involuntarily co-contracted in at least one facial expression, which can for example permit authentication to be performed in dependence on the electrical muscle activity characteristic of this involuntarily activated muscle. The predetermined plurality of facial muscles can include corresponding muscles from each side of a user's face, and the processor is suitably configured to determine a measure of asymmetry in the electrical muscle activity of the corresponding muscles. This can permit authentication to be performed in dependence on the asymmetry (or a measure of the asymmetry) between the activation of these corresponding muscles.

The processing by the processor of the time-varying signal suitably includes comparing the signal to a previously-recorded signal or stored time-varying signal. The signal and the stored signal can be compared in raw (i.e. unprocessed, or substantially unprocessed) form or in modified (or processed) form. This permits flexibility in the comparison of the signals, for example the processing power and/or algorithms that may be required. The comparison of the signal with the stored signal can include determining whether a number of features of the signals correspond. The data set can include one or more stored signal features. Signal features of the time-varying signal can be compared to the one or more stored signal features. Suitably the processor is configured to determine whether a threshold number of signal features of the time-varying signals correspond to the one or more stored signal features. The threshold number of signal features can be selected as desired to provide a comparison of desired accuracy. The higher the threshold number, the higher the accuracy of the comparison. Features of the signal can be determined to correspond to one another where the features are within a predetermined tolerance (for example within about 15%, 10% or 5%) of one another. Signal features of the time-varying signal can be determined to correspond to one or more stored signal feature where a signal feature exceeds a threshold value for that signal feature, the threshold value being determined in dependence on the respective value of the stored signal feature. The processing can include determining whether the signal or signal feature and the stored signal or stored signal feature are within a predetermined tolerance (for example within about 15%, 10% or 5%) of one another.

A first authentication level can be determined in dependence on determining that a first threshold number of signal features corresponds to the one or more stored signal features, and a second authentication level can be determined in dependence on determining that a second threshold number of signal features corresponds to the one or more stored signal features. Suitably the second threshold number is greater than the first threshold number. The second authentication level can permit authentication of the user to a higher security level. A first authentication level can be determined in dependence on determining that the respective signal features (of the time-varying signal and of the stored time-varying signal) are within a first tolerance of one another, and a second authentication level can be determined in dependence on determining that the respective signal features are within a second tolerance of one another. Suitably the second tolerance is smaller than the first tolerance. The second authentication level can permit authentication of the user to a higher security level.

The processor may be configured to process the time-varying signals to obtain a plurality of representative values of the time-varying signals. The data set may include a plurality of stored representative values. The representative values and/or the stored representative values may be generated by a predefined algorithm. The processor may be configured to compare the representative values to the stored representative values. The system may authenticate a user in dependence on this comparison.

In the following discussion, it is to be understood that where 'processing' occurs, this processing can be performed at one or both of the headwear and the remote device. Similarly, a data set can be stored at one or both of the headwear and the remote device. However, preferably or advantageously, where the processing is performed at the remote device, the data set is stored at the remote device rather than at the headwear. This avoids the need for the data set to be transmitted back to the headwear for storage. However, in some examples, it may be desirable for the processing during an enrolment phase to occur at the remote device, to save on processing power at the headwear, but for the subsequent identification and/or authentication of a user to occur at the headwear. In such examples, the data set which is the result of processing performed at the remote device may therefore be transmitted to the headwear for storage at the headwear so that this data set can subsequently be accessed at the headwear.

The principle of operation of the system will now be described. Biometric recognition involves comparing an acquired biometric signature (such as a newly acquired biometric signature, i.e. a 'live' signature) against signature templates in a registered or enrolled biometric signature template database. Additionally or alternatively, the acquired biometric signature can suitably be processed in dependence on the template database and/or a stored data set which represents characteristic electrical muscle activity for one or more users. This calls for two phases of system operation: enrolment and recognition.

Additional layers of information may be used for enrolment or recognition in combination with the biosignal. Such additional information may include IMU data, head position, line of gaze, user location, presence of object in real, virtual or augmented space, and/or additional biometric inputs such as voice, eye scanning, limb gesture and/or heart biosignals.

Suitably, in the enrolment phase, neuromuscular activity is recorded during controlled facial expressions, based on a system of connected biosensors that reads the biometric signals through the skin, for example by skin contact. These biosensors can be located on headwear, for example a helmet, mask, balaclava, visor, mask, glasses, earphones and/or headset. At least one biosensor may also collect other biometric signals including one or more of heart rate and rhythm, heart rate variability, skin conductance level, skin temperature and so on.

In the enrolment, or calibration, phase, a user is instructed to select a calibration mode (although in some examples, a calibration mode might be entered automatically, as desired). In this mode the system records a representative sample of time-varying data from the user which, in its raw or processed form, can later be used to identify and/or authenticate that user. Suitably, the user is prompted to carry out a series of facial expressions and/or head gestures, which might be one or more expressions and/or one or more gestures. Alternatively, the user can carry out any series of facial expressions and/or head gestures. The system is suitably configured to determine which expression or gesture is being performed and to cause the recorded signals to be associated with that user with the determined expression or gesture.

Figure 5:
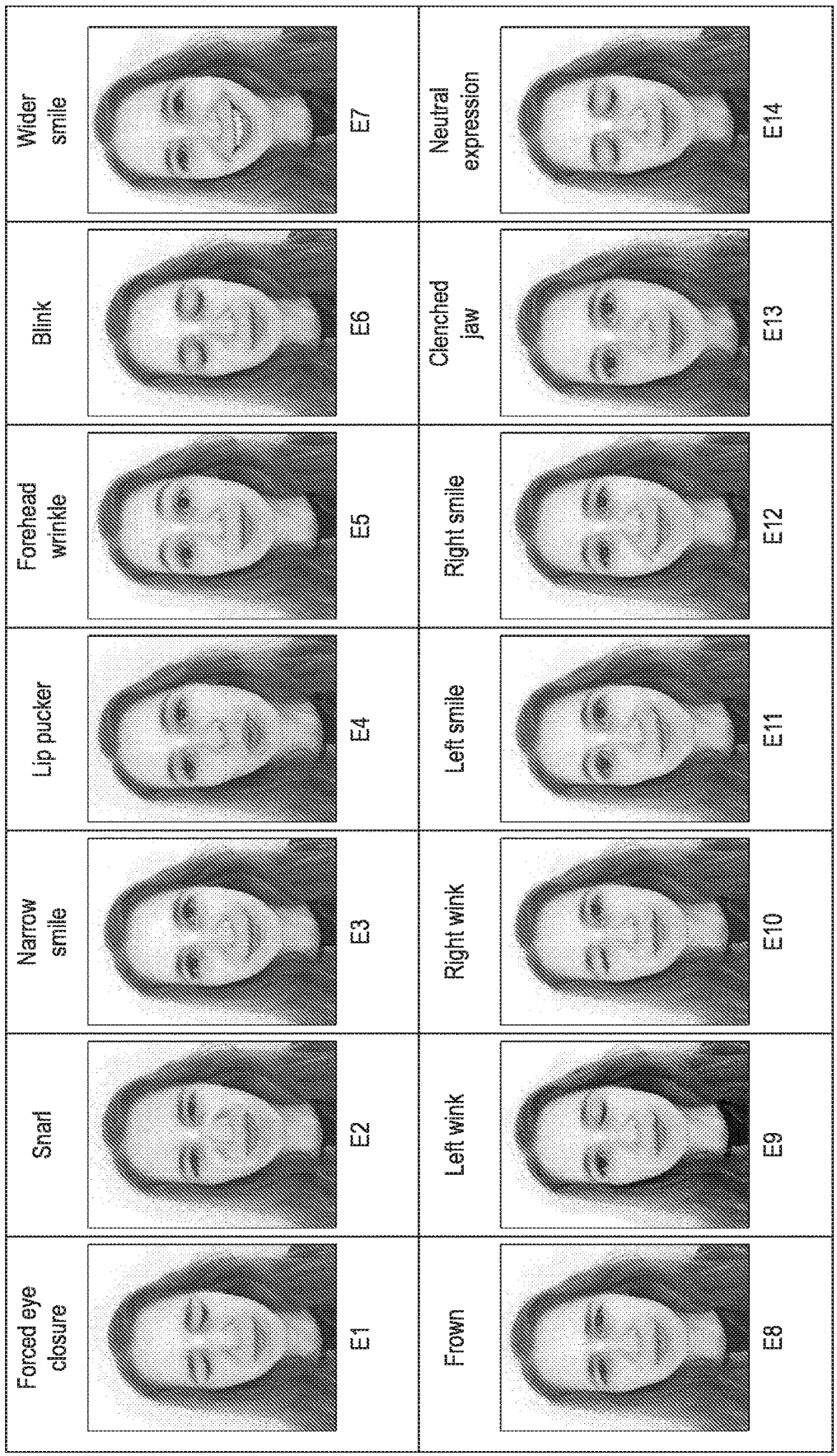
FIG. 5 illustrates facial expressions.

Options for gestures include but are not limited to a forced eye closure, a snarl, a narrow smile, puckering of the lips, a forehead wrinkle or an eyebrow raise, a blink, a wider smile, a frown, a wink of the left eye, a wink of the right eye, a left smile, a right smile, a clenched jaw and a neutral expression. These expressions are illustrated in FIG. 5, as expressions E1 to E14. A jaw clench is particularly useful as this gesture can be performed with the face in a neutral posture for added discretion during identification and/or authentication.

Further, head gestures such as a nod, tilting the head sideways, shaking the head and so on, can also be used. This permits an increase in the complexity that may be required for authentication.

As the user performs the series of expressions data is captured from the biosensors. Suitably, as a user performs the expressions, the muscle activity of the user's facial muscles are detected by the biosensors, and time-varying signals representing this muscle activity are generated by the biosensors. The time-varying signal (or signals) are output by the biosensors for storing and/or processing.

Suitably, a method for calibrating a biometric authentication system, or a method of authenticating a user, includes storing at a data store parameters defining a pattern in the signal from the biosensors which is characteristic of a facial expression of a user. The stored parameters can be processed to generate calibration information for each of the biosensors defining a correspondence between the signal from that biosensor and the activity of the respective facial muscle. The method may include indicating to the user one or more facial expression for the user to perform. The method may include entering a calibration mode in advance of storing the parameters.

Once the recording is complete, the time-varying signal representing the muscle activity data (e.g. an EMG or optical data from skin overlying the muscle), and, if required, additional data such as an inertial measurement unit (IMU) signal, is analysed or processed. The processing suitably reduces the amount of data needed to be stored. For example, periods at the start and/or end of the recording which relate to 'background' signals rather than those generated by the expression (e.g. where the user has not yet started the expression or has finished the expression) can be clipped since these will not generally represent useful data. A suitable algorithm can be used for such clipping. Suitably the processing of the time-varying signal results in a set of electro-biometric signature templates (subject-specific discriminating features) unique for each individual which are suitably used for construction of a database.

Examples of time-varying signals recorded from two users are shown in FIG. 6. Each of the illustrated plots includes 8-channel EMG data recorded during a particular facial expression. In each case the signals indicative of the expression appear just after halfway through the plots. The early part of the plots may therefore be clipped as mentioned above, to save data processing and/or storage requirements that may be necessary. FIGS. 6A-6C illustrate signals recorded from a first user; FIGS. 6D-6F illustrate signals recorded from a second user.

Figure 6A:
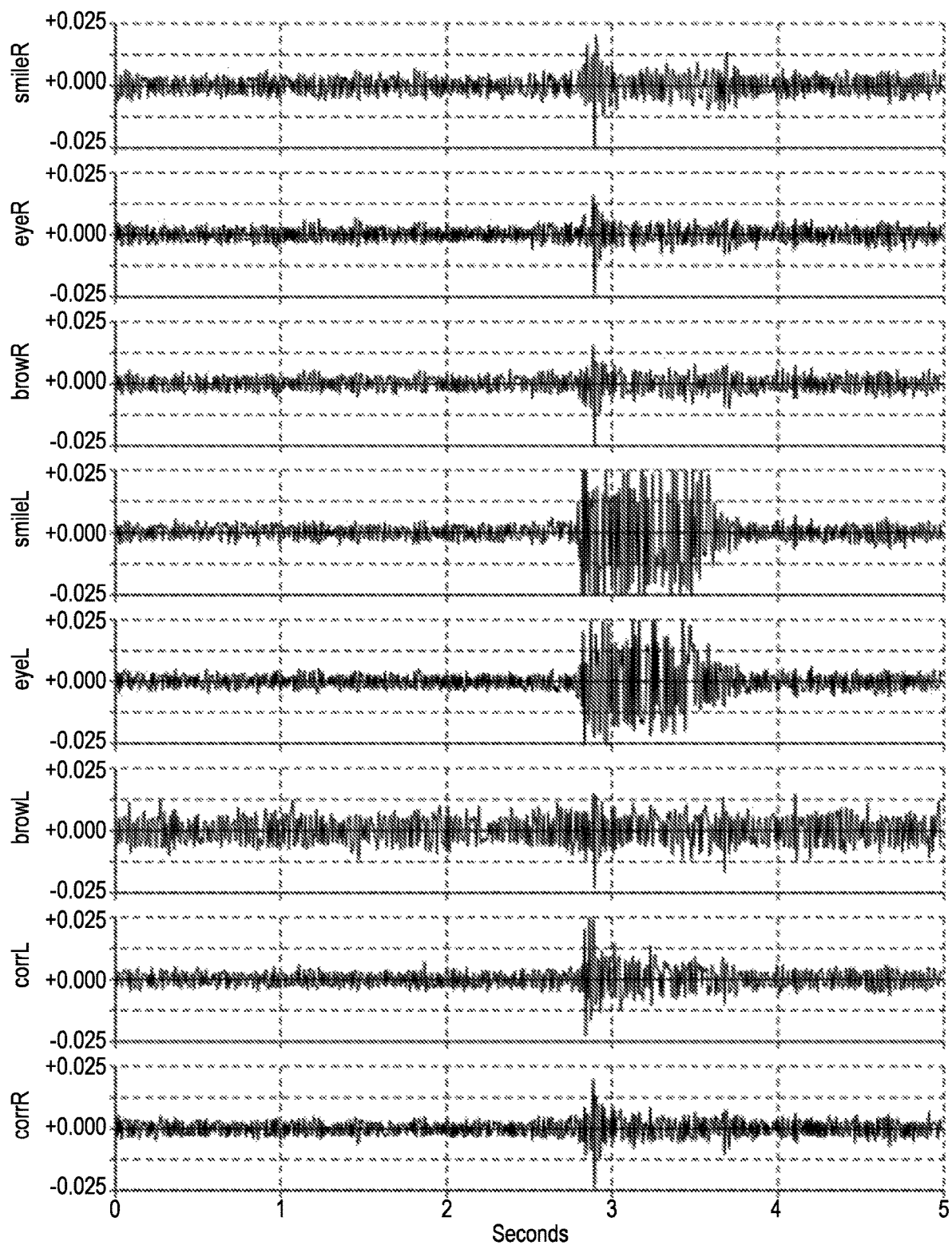
FIGS. 6A to 6F illustrate 8-channel EMG signals of two different people performing a left eye wink.
Figure 6B:
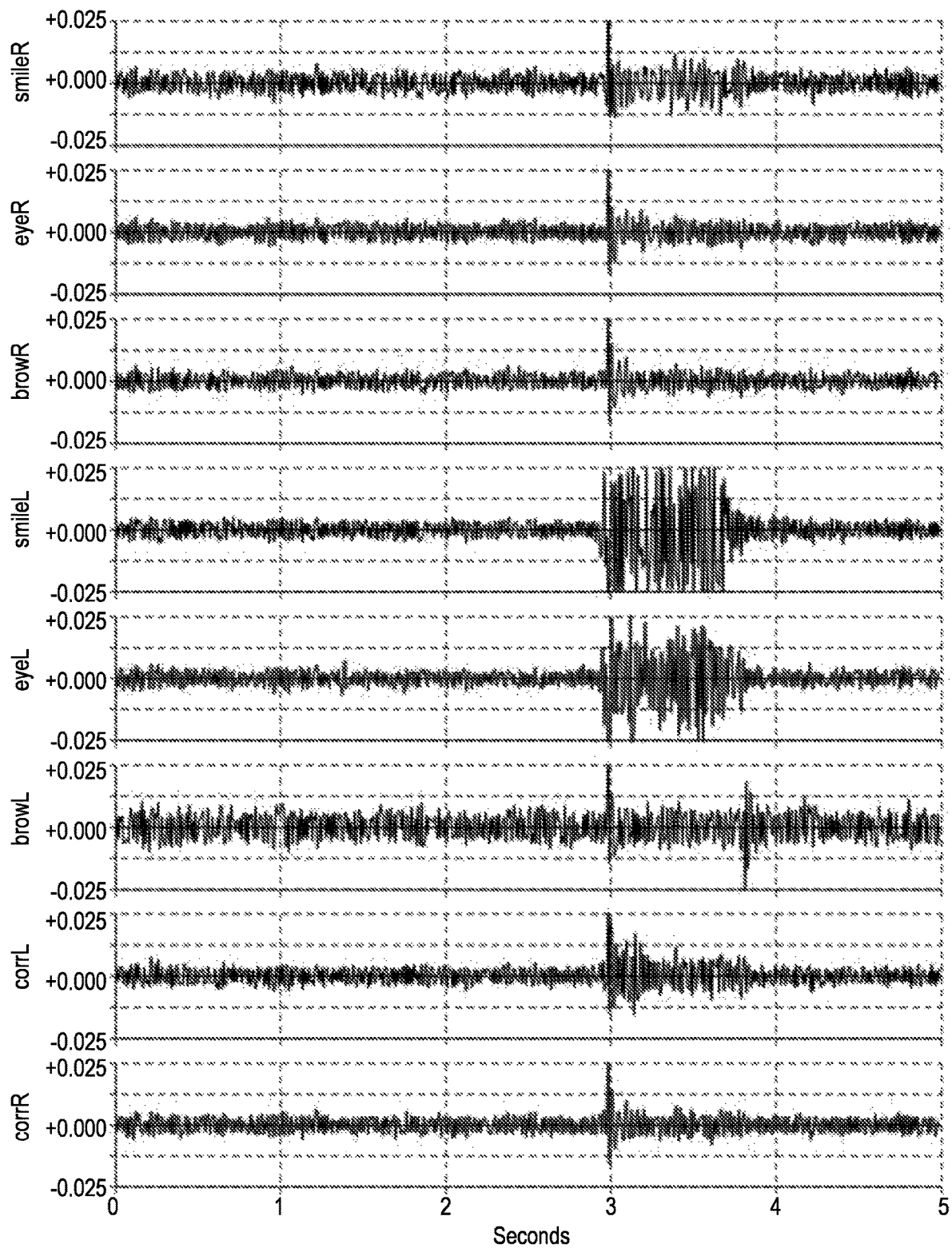
Figure 6C:
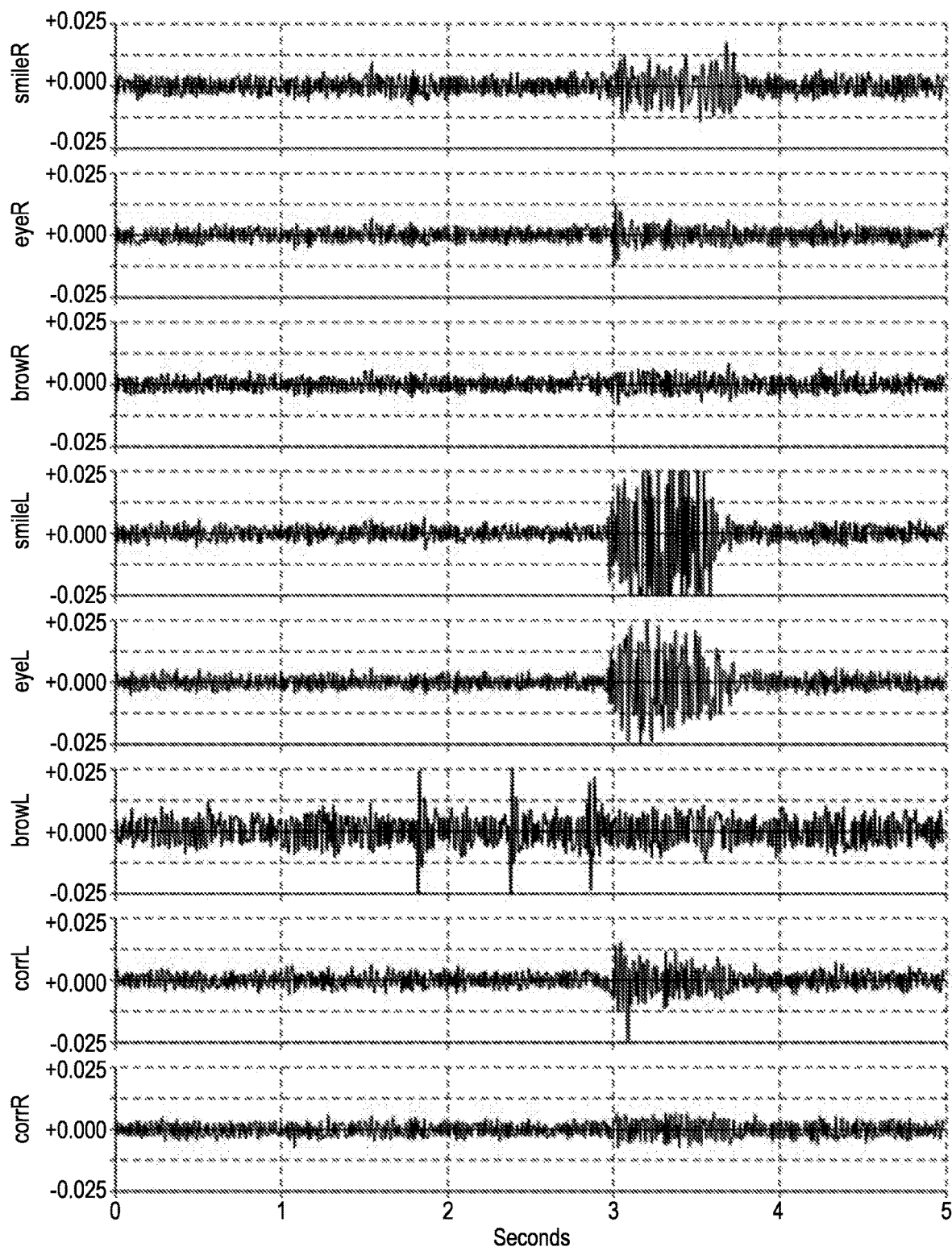

Referring to FIGS. 6A-6C, the plots show that signal patterns illustrating muscle activity of muscles (some of which are involuntarily activated muscles) demonstrate similitude where the same user performs the same expression a number of times. EMG is used in this example but it should be understood that other measurers of muscle activity could be used instead. Pattern similitude between different recordings of the same user performing the same expression can also be seen from FIGS. 6D-6F. Comparing FIGS. 6A-6C with FIGS. 6D-6F, it can be seen that there are recognisable differences in relative signal properties between the first user and the second user.

These differences are characteristic of the user, and can be used to distinguish between users. However, rather than using the raw signals, it is preferable or advantageous to process the raw signals, and to use the processed signals to distinguish between users.

For example, referring to FIGS. 6A-6C, in the first (uppermost) channel (smileR), the signal amplitude increases above the background level at approximately halfway through the plot, returns to the background level at approximately three quarters of the way through the plot. The behaviour of the signal amplitude of the first channel is consistent across FIGS. 6A-6C. Thus this behaviour, on the basis of these figures, has a high intra-subject repeatability, and therefore appears to be a useful feature. This feature, or behaviour, of the channel (or, in more general terms, of EMG data) can be extracted and used as a characteristic feature, or behaviour, of that user. It can be characterised as the signal amplitude of the first channel exceeding a threshold level, where the threshold level is set to be at or just above the maximum values typically attained during the 'background' portions of the plot. Optionally, to reduce the effect of noise spikes causing the first channel signal amplitude to exceed the threshold, the feature can be characterised as the signal amplitude of the first channel exceeding a threshold level for at least a threshold period of time, and/or or the average (such as a time average) of the signal amplitude exceeding a threshold level, optionally also for at least a threshold period of time. The threshold level and the threshold period of time can be set based on measured or expected values. For example, the threshold level can be set at 1.5 times, 2 times, 5 times, 10 times, and so on, the maximum of the background signal recorded during a set-up phase. The threshold period of time can be set at some fraction of the expected duration of a facial expression. For example, where a facial expression may last for 0.25 seconds (such as a wink), the threshold period of time can be set at 0.25 times, 0.5 times, 0.75 times, and so on, that duration. The threshold level and the threshold period of time can be set in many other ways, as would be apparent.

Features can be extracted from other channels. For example, referring again to FIGS. 6A-6C, the fourth channel (smileL) and fifth channel (eyeL) might similarly lead to a characteristic of the respective signal amplitudes (or their averages) exceeding respective threshold levels (optionally also for respective threshold periods of time). The signal amplitude of the seventh channel (corrL) appears to increase and then decay over a period of time. The behaviour of this channel might therefore lead to a characteristic for this channel of the signal amplitude (or its average) exceeding a respective threshold level, with the signal amplitude (or its average) then decaying over a threshold period of time.

The sixth channel (browL) in figured 6A-6C appears to remain at substantially background levels throughout the plot. This can lead to a characteristic of the signal amplitude (or its average) for this channel not exceeding a respective threshold level.

Figure 6D:
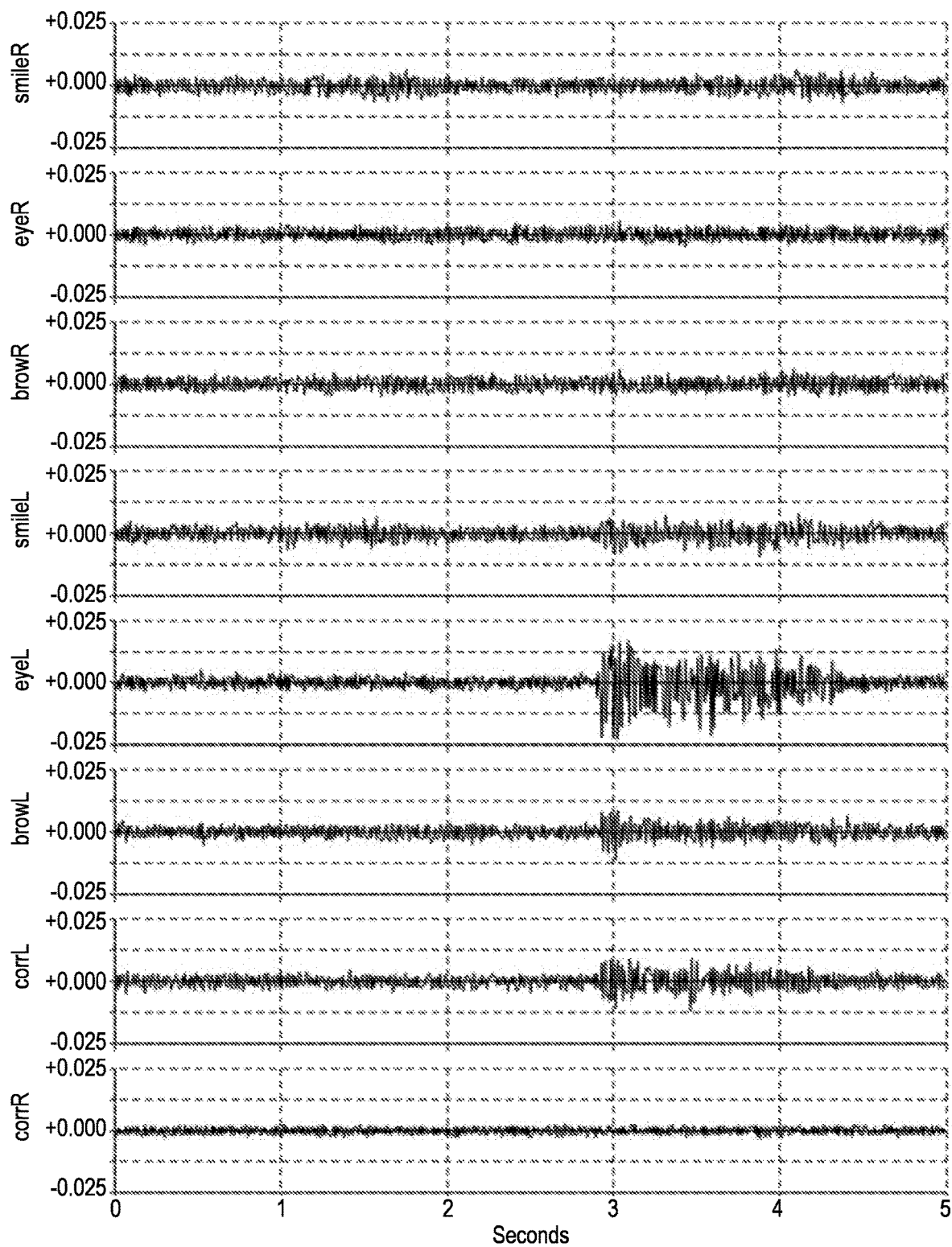
Figure 6E:
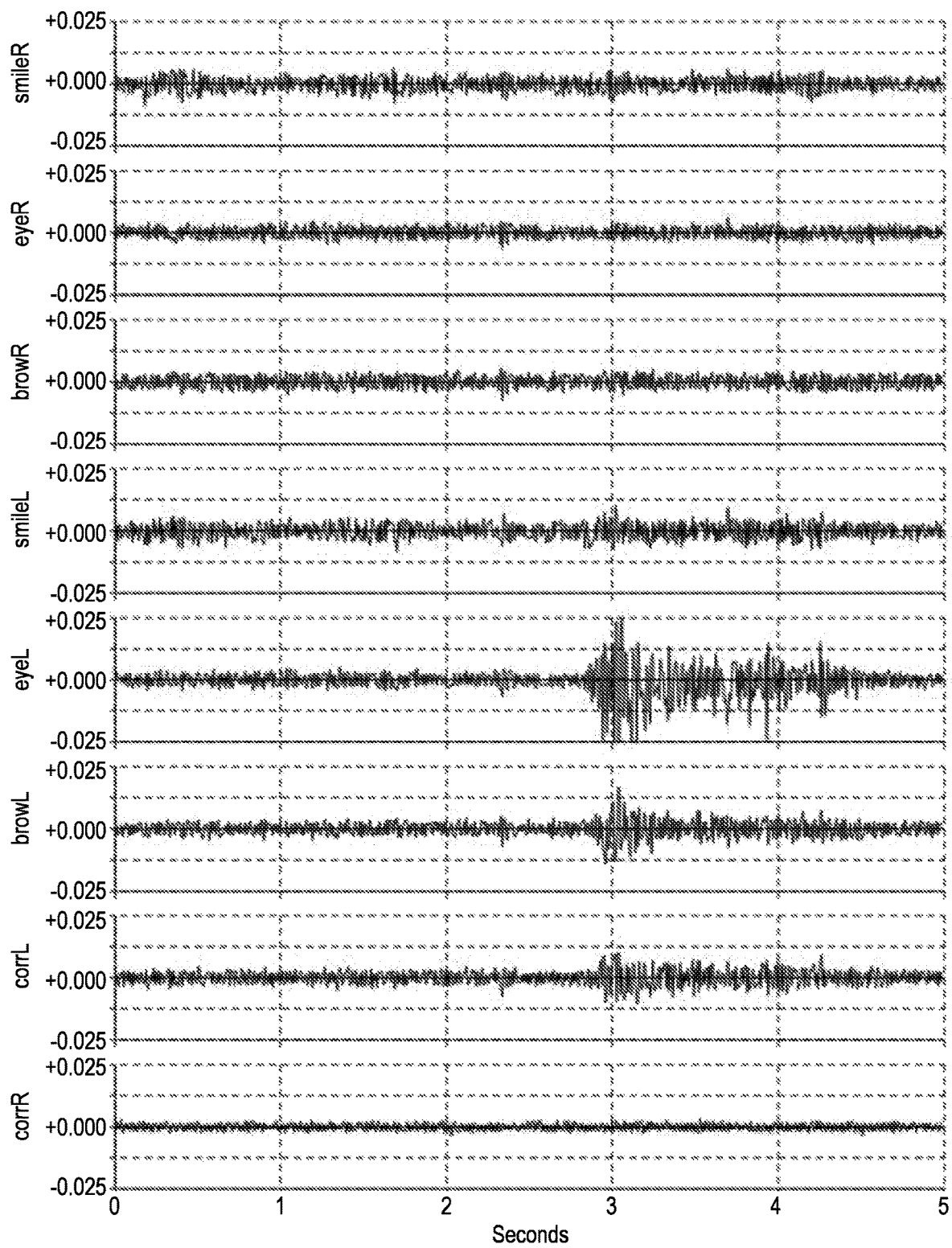
Figure 6F:
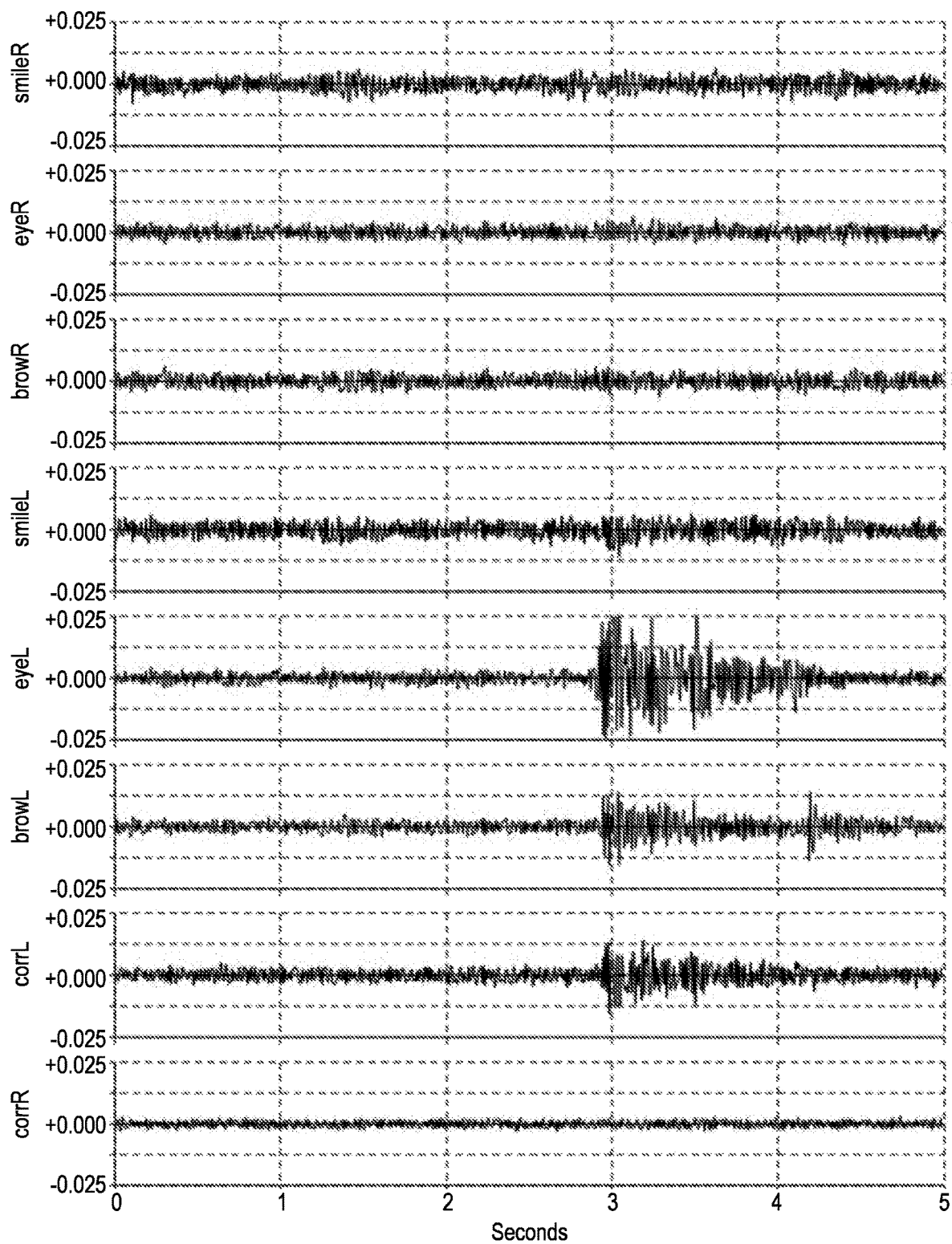

An electro-biometric signature template can be formed from one or more characteristics or signal behaviour. For example, a comparison of FIGS. 6A-6C with FIGS. 6D-6F shows that the fourth channel (smileL) can be used to distinguish between these two users for this particular expression: the signal amplitude of the fourth channel in FIGS. 6A-6C distinctly rises above the background level, whereas the signal amplitude of the fourth channel in FIGS. 6D-6F does not. Thus a template formed using the characteristic of the fourth channel will be successful in distinguishing between these two users.

Building up more complex templates, by increasing the number of characteristics on which the templates depend, and/or by increasing the complexity of one or more characteristics (for example by being more specific about relative amplitude increases and/or timings and so on), will lead to a greater level of discrimination between a larger group of users. For example, a template can be formed based on the fourth and fifth channels (smileL and eyeL) rising above respective threshold levels, the seventh channel (corrL) rising above its respective threshold level then decaying, and the sixth channel (browL) not rising above its threshold level. Such relatively more complex templates are likely to be able to distinguish more accurately between users. Of course, a much greater complexity is possible than described here in this relatively simple example.

Rather than needing to store all or most of the data received or recorded as part of the time-varying signal, it is possible to limit the storage requirements that may be necessary to a much more limited amount of data, for example one or more channel identifiers and threshold values (for amplitude levels and/or periods of time). More generally, the characteristics of the behaviour of time-varying signals, such as their amplitude levels (or amplitude levels relative to background or threshold levels) and/or the time duration of amplitude level changes can be stored and/or used to form a template for a particular user, for example for a particular expression.

The signal features might describe or include values abstracted from the muscle activity of a user, for example from a time-varying signal. For example, a set of signal features might be derived by applying an algorithm to a time-varying signal and storing parameters for that algorithm and/or algorithm outputs as a set of signal features. The algorithm might be a machine learning algorithm or an algorithmic representation of a model formed using machine learning. Thus a data set representing characteristic muscle activity for a user might include the algorithm, the parameters for the algorithm, and/or algorithm outputs for that user.

In the recognition (or identification and/or authentication) phase, the subject interacts with the system in a similar manner to that of the enrolment phase. However a shorter recording time on the order of a few seconds is sufficient. In many cases the recording time can be much shorter than this. In general, the recording time can be as short as one expression (or as short as the desired number of expressions). For example, where a wink might last for 0.25 seconds, the recording time can be as short as 0.25 seconds and still be able to capture the whole expression. In some cases, the recording time can be less than the time duration of one expression. For example, where an expression is 2 seconds long, say a smile, the characteristic behaviour might be able to be extracted within a 1 or 1.5 second period. Therefore an accurate template can be constructed without needing to record the entirety of the expression.

In general, the recording time in the recognition phase can be as short as the time duration of a subset of expressions or gestures used in the enrolment phase.

In a verification procedure, the system processes the time-varying signal in dependence on the stored data set so as to determine a correspondence between the time-varying signal and the characteristic muscle activity. The system suitably then authenticates the time-varying signal as being associated with one or more authorised users in dependence on the determined correspondence. In one example, the system is configured to process the acquired signals, form a biometric subject signature and compare it with the subject's enrolled biometric signature template.

In a subject identification procedure, the biometric data for a subject in the data collection may be compared with the biometric data in the data collection for some or all or most of the subjects included in the data collection. This comparison may yield information that can help identify a subject as someone who is already included in the data collection.

The facial gestures used in the recognition phase may be used in any combination, for example a jaw clench, a neutral expression and a smile. The facial gestures may be used in any order, or in a specified order. Further, the facial gestures may be used with or without head gestures which may be used in combination with one or more facial gesture for added complexity. For example, a sequence of wink, nod, clench.

Where facial gestures can be used in any order, the system is suitably configured to recognise each facial gesture and to process the resulting signal from that gesture accordingly. In one example, the user may (with or without prompting) perform a series of a number (three, for example) of facial gestures. In some examples, the identity of a user can be determined if a given number of those facial expressions (up to the total number in the series; two in one example) result in a correspondence between the user and a known user.

Where facial gestures need to be used in a particular order, the system is suitably configured to prompt the user to perform the required gestures that may be necessary in the required order that may be necessary. Alternatively, the user may perform the required series of gestures without prompt. Such an approach can enhance the security of the system since identification/authorisation would then be based both on 'what you know' (the order of the expressions) and 'what you are' (the characteristic muscle activity of the user) criteria.

Any suitable number of facial expressions can be used. The greater the number, the greater the complexity and the higher the security of the system. In practice, this is likely to be balanced by the user-friendliness of the system: requiring too many expressions will take a long time and potentially exhaust or irritate the user. Statistically, a more complex template (based on a larger number of expressions) will enable discrimination between a larger pool of users. For a game console logon authentication system, where the system may need to distinguish between, say, 10 users, it may be sufficient to use a single expression. For a banking authentication system, where the system is likely to need to distinguish between a significantly larger user group, and to a greater degree of accuracy, a series of four or five expressions may be required to provide the desired level of security.

In general there will exist for each user a natural asymmetry between the signals representing muscle activity between the left and right sides of the face. Suitably the processor is configured to distinguish this asymmetry. The presence and/or quantification of this asymmetry can be used as a feature during the authentication process. For example, the feature can include a ratio of signal amplitudes from muscles, such as corresponding muscles, on each side of the face. Suitably the feature can be determined to be satisfied if the ratio measured in the recognition phase is within a certain tolerance of the enrolment ratio.

The tolerance can be less than about 15% difference, less than about 10% difference or preferably or advantageously less than about 5% difference.

The highest frequency components of electrical muscle activity data such as surface EMG signals are typically around 400-500 Hz. Convention thus recommends sampling rates of 800-1000 Hz, particularly when used with an anti-aliasing filter with a high frequency cut-off of 400-500 Hz. Accordingly, the sampling frequency may suitably be set to 1000 Hz for EMG acquisition. However the sampling frequency may vary under different circumstances, for example if multiplexing the sensors.

A discussion of the ways in which the time-varying signal may be processed now follows. Any one or more of these processing approaches can be applied in any combination, as appropriate for a particular situation and requirements that may be necessary, for example whether processing power is less of a restriction and a very high level of security is desired (such as might be true of a financial authorisation process) or whether the identification should be low-power and quick (such as might be true when identifying the user of a games console from a limited number of users). As an exemplar of biosignal processing we describe EMG data processing, however data captured from the face may include EOG or other biosignals as mentioned previously.

Clipping: The time-varying signal can be clipped to cut out portions of the signal that are recorded before (and/or after) the expression is being made. Such portions will not contain relevant data. Hence storing and/or processing those portions may not be necessary. Clipping the time-varying signal to portions of interest can therefore lead to processing and storage efficiency gains. A suitable algorithm can be used to determine the relevant portions of the signal to be clipped. In some examples, onset detection (mentioned below) can be used to determine the start of a portion of the signal that is of interest. The end of a period of interest can be determined, for example, by monitoring an expected duration of an expression from a detected start point, and/or by determining when another threshold is crossed. For example, referring to FIG. 6A, when the signal amplitude (or its average) falls below a threshold indicating that the signal has returned to background levels, the system can determine that the expression has ended. This 'end' threshold may be the same as the threshold used to determine when the expression starts (i.e. a 'start' threshold), or it could be different, such as below, this start threshold. The use of different thresholds can avoid the system flipping between start/end detections where noise is present in the signal as the signal amplitude crosses the threshold or respective thresholds. Suitably, the difference in thresholds is at least the same as the maximum amplitude of the noise on the signal, or a multiple of this maximum amplitude, where the multiple is greater than one.

Notch filtering: A notch filter is typically a filter that strongly attenuates the power over a narrow region of the spectrum. Here, a notch filter at 50 Hz or 60 Hz, depending on the local conditions, may be used to filter out power line noise with minimal disruption to the rest of the signal.

Band-pass filtering: Filtering of the EMG signals may be used to optimise the signal to noise characteristics. For example, EMGs may be band-pass filtered using a 6th order butterworth filter within the range of 30-450 Hz to cover the most significant spectrum of facial EMG signals. However other filters may be used as conventionally known.

Onset Detection: Analysis of the surface EMG may require the determination of rapid transient changes in the activation pattern indicating transitions between different motor-related processes that contribute to the production of a particular motor act. Different techniques can be applied in this step. A standard approach for on and off time estimation is to determine the times at which the envelope of the signal exceeds a threshold. The threshold may be given by Threshold=$\mu+k\sigma$ where $\mu$ and $\sigma$ are the mean and standard deviation of the envelope during a period of inactivity, and k is a constant. In one example, $\mu$ may be 8.13, $\sigma$ may be 5.32 and k may be 1.

Data Segmentation: Feeding most or all signals directly to a classifier is not usually practical due to the enormous amount of data and some non-informative or artefactual EMG data. Therefore, to improve efficiency, signals can be mapped into lower dimension vectors (feature vectors) to highlight one of the important properties of EMGs. The data can be segmented into a sequence of time portions for use in feature extraction. Since neuromuscular signals can include or can consist of transient and steady states, a transient state is capable of classifying the myoelectric features which are extracted 100 msec after onset of muscle activation with high accuracy. However, an issue with this approach occurs while switching from class to class (i.e. from one expression or gesture to another) in real time (such as in real-time control). In this case the transient state of the EMG signal may not have enough information, for example if the expression is changed part-way through the expression, and the system may be unable to detect the type of facial expression correctly. Thus, where there are multiple degrees of freedom in complex systems, such as will occur where a plurality of facial expressions and/or gestures are used, the use of the transient state may result in reduced accuracy in some situations, such as might occur when an expression is changed before the transient state of the EMG signal has enough information. Steady state data with 128 msec segment length is much more accurate than transient data for hand gesture classification, and it is more reliable when a faster system response is needed.

In a generic framework, relatively longer segments tend to result in relatively higher computational load and a greater propensity for failure in real-time operations. Relatively shorter segments tend to lead to bias and variance in feature estimation. In light of this, to address real-time restraints, it is suggested that segment length should be equal to or less than 300 msec. Further the minimum interval between two distinct contractions of motions is almost 200 msec which means that segments longer than 200 msec should contain sufficient information for classification. Segments of between about 200 and 300 msec length, for example 256 msec length, may suitably be used with facial EMG signals. According to the requirements that may be necessary and computational constraints, non-overlapping or overlapping time segments of any suitable length may be used depending on the level of security and performance that may be required.

Feature Extraction: Classifying large numbers of EMGs creates significant computational demand, and it is helpful to map EMG data into a lower dimension. The purpose of feature extraction is to highlight the significant properties of EMGs and make the raw signals and/or processed signals derived from the raw signals more meaningful for classification. There are numerous methods previously described with varying levels of complexity and efficiency in diverse domains (time, frequency, time-scale) which represent different EMG signal characteristics. For the purpose of myoelectric classification, time-domain features are generally suitable due to simple representations of different motion and gesture characteristics and low computational load in real-time applications. In the present techniques, the Mean Absolute Value (MAV) of each segment may be used. The MAV can be computed as a feature by the following equation:

$$MAV_k = \frac{1}{N}\sum_{i=1}^{N}|x_i|$$

where N is the length of the segment, k is the current segment, $x_i$ is the current point of signal and i is the index of the current point.

Pattern Recognition: Extracted features need to be classified into distinct classes for the recognition of facial expressions. A variety of factors, such as electrode position, muscle fatigue, and skin surface conditions, cause variations in the EMG data acquired over time and may result in misclassification. Hence, a classifier should be able to cope with these issues. Moreover, the classifier must or should be fast and/or proficient enough to meet real-time restraints and classify the novel patterns during the online training. A significant issue is the potential variability in repeatably performing a specific voluntary expression.

An example of a pattern matching method is the Support Vector Machine (SVM) which is a kernel-based approach with a strong theoretical background, and is a conventional tool for machine learning tasks involving classification and regression. A SVM constructs an optimal separating hyperplane in a high-dimension feature space of training data that are mapped using a nonlinear kernel function. Therefore, although it uses a linear machine learning method with respect to the nonlinear kernel function, it is in effect a nonlinear classifier. The use of a nonlinear kernel function greatly increases the power of learning and generalisation. Training an SVM involves the optimisation of a convex cost function; there are relatively few free parameters to adjust, and the architecture does not have to be found via experimentation.

SVM employs a regularisation parameter that allows adaptation to outliers and error on the training set. Here, a multi-class SVM with a one-versus-one scheme is used along with a polynomial kernel function, and the penalty factor is, in some examples, tuned at 1000. Suitably, in the present techniques, the muscles activated as part of the voluntary expression are used for pattern matching. As the spatial relationship between the electrodes is fixed, the activation of other electrodes follows a stereotyped pattern. An additional layer of security is achieved by performing pattern matching specifically focusing on the involuntary and antagonistic muscles that also activate. As an exemplar, during an eye wink, which is a voluntary contraction of one orbicularis oculi, the consensual activation of the opposite orbicularis oculi is antagonised by the contraction of the opposite frontalis muscle which acts to elevate the brow and helps to keep one eye open. The relationship between the voluntarily activated orbicularis, the involuntarily activated opposite orbicularis and the involuntarily activated frontalis are difficult to replicate, and form a dynamic biometric. An example is shown in FIG. 6. Other examples of combinations of active and involuntary muscle activations exist such as co-contraction of the peri auricular muscles with brow elevation or smiling (as shown in FIG. 7).

Statistical Analysis: A reliable biometric trait should have low intra-subject variability, high inter-subject variability, and high stability over time. In order to investigate inter-subject variability, a statistical significance test may be applied on one trial of a particular facial expression of a plurality of subjects. An example that can be applied to this type of data is an analysis of variance (ANOVA). Such a test reveals if the facial EMG raw data or the extracted temporal features are significantly different within the subjects (as shown in FIG. 7). Besides, by testing different types of facial expressions, it is possible to find the best or better facial expression that statistically can deliver the most significant difference within subjects. It is expected that such an expression is one which involves co-contraction of antagonistic muscles. Another test can be designed to examine the intra-subject variability by considering most or all trials (repetitions) of a similar facial expression performed by a subject. Very low variability for intra-subject trials indicates that facial EMG generated from facial expressions are reproducible.

Suitably, the processor is configured to perform signal pre-processing on at least one of the obtained time-varying signals (such as EMG data) including one or more of: signal baseline correction, signal denoising and signal onset detection. Signal baseline correction can include resetting the time-varying signals to a zero DC offset. Signal denoising can include increasing the signal to noise ratio by one or more of signal conditioning, signal filtering and signal smoothing. Signal onset detection can include applying thresholding to the signal. The thresholds are suitably predetermined, and may vary between users. For example, during a machine learning process, the algorithms can determine a suitable threshold across most or all users, across a subset of users, or for an individual user. Suitably the threshold is approximately 10%, 20%, 30%, 40%, or 50% of the peak value of the signal. Applying such thresholding can mean that the system may only need process informative portions of the time-varying signals, e.g. where the threshold has been met or exceeded.

A log transform may be applied to a time-varying signal in order to make the feature vectors more separable. This can aid in feature extraction. Suitably the processor is configured to construct a model for each user or individual using the time-varying signal obtained in the enrolment phase, and/or the features extracted from that time-varying signal. Suitably the processor is configured to evaluate the model for each individual using the time-varying signal obtained in the recognition phase, and/or the features extracted from that time-varying signal. Suitably the model is constructed through an individual's facial enrolment or calibration signal or extracted features of that signal to train a machine learning algorithm. The machine learning algorithm can include a kernel machine such as a Support Vector Machine (SVM), a neural network such as a radial basis function (RBF), a discriminant analysis method such as linear discriminant analysis (LDA) and/or k nearest-neighbour (KNN) for user identification and/or authentication.

In some examples, the system is configured so that the construction of the model for each individual incorporates synchronisation between an action occurring in the real world (for augmented reality use) and/or a virtual world.

Once the time-varying signal (or signals) has been processed, the processed time-varying signal is suitably stored at a data store, accessible to at least one of a processor at headwear 100, 200 and a processor at a remote device 400. As mentioned above, the raw signal need not be stored, though it could be. The stored time-varying signal, e.g. the processed signal, suitably forms at least part of a data set. The data set suitably represents characteristic electrical muscle activity for one or more users, for example as determined during the enrolment phase.

The stored data set is available to the processor (at either or both of the headwear 100, 200 and the remote device 400). The dataset may be in any suitable form: e.g. as a set of relationships stored at a table or other data structure; as relationships defined in equation(s) or algorithm(s) performed at the processor; and/or a machine learning model (and/or its parameters) used by the processor to perform muscle activity detection and/or characterisation.

In examples of the present techniques, in the recognition phase, the user is prompted to perform a predetermined series of facial expressions (which suitably includes more than one facial expression). The processor is configured to process time-varying signals obtained from the biosensors so as to determine a correspondence between the time-varying signals and the characteristic electrical muscle activity. This is preferably or advantageously achieved by processed the time-varying signals in dependence on the stored data set. In some examples, this can be achieved by comparing the time-varying signal with a stored (or previously-recorded) time-varying signal. In some examples, this can be achieved by determining whether the time-varying signal matches a stored time-varying signal. A match can be determined where the two signals are within a predetermined tolerance, say within 10% or preferably or advantageously within 5% or more preferably or advantageously within 2% of one another.

Suitably, as discussed herein, processing the time-varying signal can result in features, such as signal features, being extracted from the time-varying signal. Thus, one or more extracted feature of the time-varying signal can be used to determine whether to authenticate the user. For example, the one or more extracted feature (or signal feature) can be compared with one or more stored extracted feature (or signal feature). It can be determined whether the extracted features match or satisfy the stored extracted features. A match can be determined where the extracted feature or features and the stored extracted feature or features are within a predetermined tolerance, say within 10% or preferably or advantageously within 5% or more preferably or advantageously within 2% of one another. Satisfaction of the stored extracted features can be determined when the extracted features cross a threshold level (optionally for at least a predetermined period of time) with respect to the stored extracted features.

Where the system determines that the signals or extracted features are sufficiently similar to one another (noting that this level of similarity can be selected in dependence on the processing, time and/or security requirements that may be necessary of the authorisation process, with a greater similarity being that may be required for higher level security) where similarity can be determined based on the number or proportion of extracted feature matches or extracted features that satisfy the respective stored extracted features, it can determine that the user is identified and/or authenticated. The system can generate an authentication signal in response to such a determination. The authentication signal can provide the user access to functionality at the headwear and/or at a remote computing device.

Where the system determines that the signals or extracted features are not sufficiently similar to one another it can determine that the user identification and/or authentication fails. The system can generate a non-authentication signal in response to such a determination, although it need not. The non-authentication signal (or a lack of an authentication signal) can restrict user access to functionality at the headwear and/or at a remote computing device.

Figure 8:
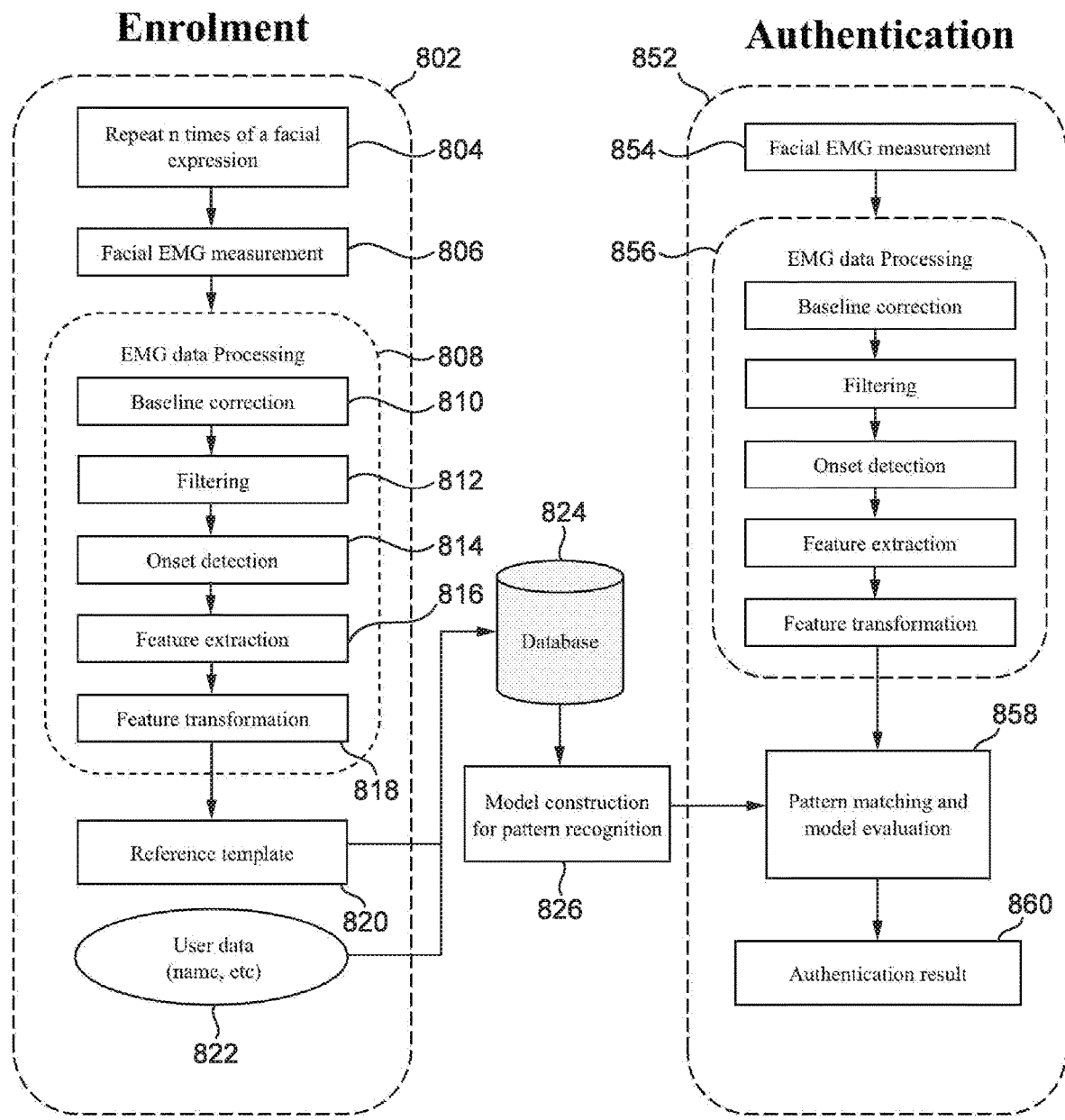
FIG. 8 illustrates an EMG-based facial expression recognition system for biometric identification.

FIG. 8 illustrates steps that might occur during an enrolment 802 and authentication 852 process. During enrolment, a user will typically perform a facial expression 804 (or more than one different facial expression). This can be as a result of a prompt from the system, or the user can perform the facial expression without a prompt. Suitably, the system prompts the user regarding which facial expression to perform. The facial expression is preferably or advantageously performed more than once by the user, so that the system can determine the variability and so on between different instances of the same expression from the same user. In general, the expression is performed n times. The system suitably prompts the user to perform the expression n times. Suitably the system prompts the user before each of the n times the expression should be performed. This can aid the system in determining the start and stop of each expression in the sequence of expressions.

During each of the expressions, the system records time-varying data from the user. In the example illustrated in FIG. 8, the system records facial EMG measurements. Subsequent to recording the time-varying data, the system processes the recorded data. This is shown at 808 in the illustrated example, relating to EMG data processing. This processing can include one or more processing steps. In the illustrated example, the processing includes applying a baseline correction 810, filtering 812, onset detection 814, feature extraction 816 and feature transformation 818. In other examples one or more of these processing steps could be omitted or replaced with one or more other processing steps.

Following the data processing, the system can use the processed data to generate a reference template (or a series of reference templates) 820. The reference template, together with optional user data such as a user's name and so on, which can be input at 822, can be stored at a database 824 (such as at a data store as described herein). The data can be used to construct a model for pattern recognition 826 for later use by the system in identifying or authenticating a user. The model can, in some examples, be constructed before the data is stored at the database. The model can be stored at the database. In some examples, the data need not be stored, where the model is stored. The data and/or model stored at the database can be considered to be a data set that represents the user and the facial expression or expressions performed.

The data set can suitably be used in a later authentication process 852. In the authentication process, a user performs one or more facial expressions, for example in response to a system prompt or prompts. The system can generate one or more signal to prompt the user. The one or more prompt signal can generate an audio or visual prompt that directs the user as to which expression to perform. The system records time-varying data from the user. In the example illustrated in FIG. 8, the system records facial EMG measurements 854. Subsequent to recording the time-varying data, the system processes the recorded data. This is shown at 856 in the illustrated example, relating to EMG data processing. The processing steps can be as described above in the context of enrolment data processing 808. The processing steps can be the same as or different from those in the enrolment phase. Suitably, the processing steps are the same in the enrolment phase and the authentication phase. This can simplify the authentication process.

Following the data processing, the processed authentication data is input to a pattern matching and model evaluation process 858 at which the authentication data can be processed in dependence on the stored data set so as to authenticate the detected time-varying signal as being associated with one or more user who has been enrolled in the system. An authentication result can then be output by the system 860. This authentication result can be used to control access to a resource.

The biosensors may, in some examples, include optical sensors. These can be considered to be biosensors since they are able to detect signals characteristic of biological criteria, such as images of the skin and/or information describing the movement of skin as discussed in the examples below. Such optical-sensing biosensors may be used additionally or alternatively to the biosensors described above. Optical sensors may be optical flow sensors configured to output as a time-varying signal a vector describing the direction and/or magnitude of skin movement over some predefined time period which is representative of muscle activity. For example, an optical flow sensor may be arranged at wearable apparatus to measure the movement of an area of skin overlying a muscle where the movement of that area of skin is representative of the activity of that muscle. An example of an optical flow sensor is the ADNS-9800 optical flow sensor which illuminates a surface whose movement is to be detected with infra-red light and monitors the resulting movement using an image sensor (e.g. a charge coupled device or CMOS sensor). Movement may be detected by the image sensor through the application of a suitable optical flow algorithm (e.g. an algorithm for tracking the movement of contrast features within a sequence of frames captured by the image sensor).

Facial features can include characteristic skin patterns or skin texture maps: similarly to how a fingerprint is a particular pattern of ridges and depressions on the skin of a fingertip, the skin's surface anatomy and micro-relief is unique. It is therefore a suitable candidate for use in distinguishing a user from another user and/or a group of users and/or the general population. The skin's surface anatomy and micro-relief is affected by both genetic factors (e.g. pigmentation, hair follicles, sebaceous pores, congenital lesions), environmental factors (e.g. sun spots, sun tanning) and localised factors (e.g. scars, infections and inflammation). Fine furrows intersect with each other, forming many types of shapes including especially triangles, and rhomboids, but also squares, rectangles, and trapezoids that contribute to the skin's glyphic patterns. The latter provide the skin with the flexibility required that may be necessary to allow various ranges of motion, particularly in mobile areas such as around joint regions. Skin wrinkles are different from glyphic patterns; wrinkles are largely genetically determined and develop over time as a result of underlying muscular activity and dermal matrix deterioration. There are also passive skin wrinkles that occur due to repeated creasing of the skin, such as occur whilst sleeping (sleep lines).

Facial features can include one or more of the location, size, orientation, colour and so on of pigmented areas of the skin, hair follicles, pores, lesions, scars and so on.

Facial features can include facial wrinkles, for example transient or dynamic wrinkles and/or static or permanent wrinkles. Facial wrinkles can develop for a variety of reasons and are generally classified as either static or dynamic. Static wrinkles are the wrinkles and folds of the skin that are present when the face is at rest and the facial muscles are not acting on the skin so as to form a facial expression. Dynamic wrinkles are those that occur due to the effects of facial muscle activity on the overlying skin. With age, stress and environmental damage (such as sun exposure and smoking), dynamic wrinkles eventually become static wrinkles.

Due to the combination of skin surface anatomy, glyphic patterns and wrinkles, the skin represents a non-uniform surface microstructure with varied reflectance.

Optical sensors may therefore be used to characterise facial skin, for example by recognising one or more particular feature of the facial skin. The headwear 100, 200 may include at least one optical sensor as well as or instead of other types of sensor. The optical sensors may be configured, in use, to capture an image of an area of the skin adjacent the optical sensor. The optical sensors are suitably configured to capture a series of images of an area of skin of a user so as to obtain an image signal which is characteristic of the area of skin imaged in the captured series of images. The area of the skin can be imaged during an enrolment phase, similar to the discussion above in the context of time-varying electrical muscle activity signals. Thus, the system is suitably configured to store a data set representing skin characteristics for one or more user. The data set can be stored at one or both of the headwear 100, 200 and the remote device 400, as discussed herein. Suitably, where an optical sensor is provided, the processor is configured to process the image signal in dependence on the stored data set so as to determine a correspondence between the image signal and the skin characteristics for the one or more users, and in dependence on the determined correspondence, to authenticate the image signal as being associated with one of the one or more users.

Suitably, the image signal is processed to extract at least a velocity of movement of the area of skin being imaged. In other words, a director, or direction of movement, and a speed of movement can be determined in dependence on the image signal. Suitably the headwear includes a processor configured to determine the velocity of movement of the area of the skin. The sensor may include the processor.

Such skin velocity can be used as a characteristic for distinguishing between subjects. Taking a frown as an example of an expression, in general the movement of the brow in a frown is downwards. In some subjects, the brow movement is more transverse and downward whereas in some other subjects, the brow movement is more vertical and downward. Determining the transverse and/or vertical component of the brow velocity and/or movement can permit distinguishing between such groups of subjects.

Optical sensors are capable of visually sampling a surface (in this case skin). The optical sensors are suitably capable of comparing samples captured apart in time so as to detect dynamic information, such as movement of the surface relative to the sensor between those points in time. A visual sample captured by an optical sensor may be any kind of representation of the surface (e.g. a photograph) or representation of light modified by the surface (e.g. an interference pattern or speckle pattern created by the surface interacting with a laser directed at the surface). Suitable algorithms may be used to track changes between visual samples which represent movement of the sampled surface.

Figure 10:
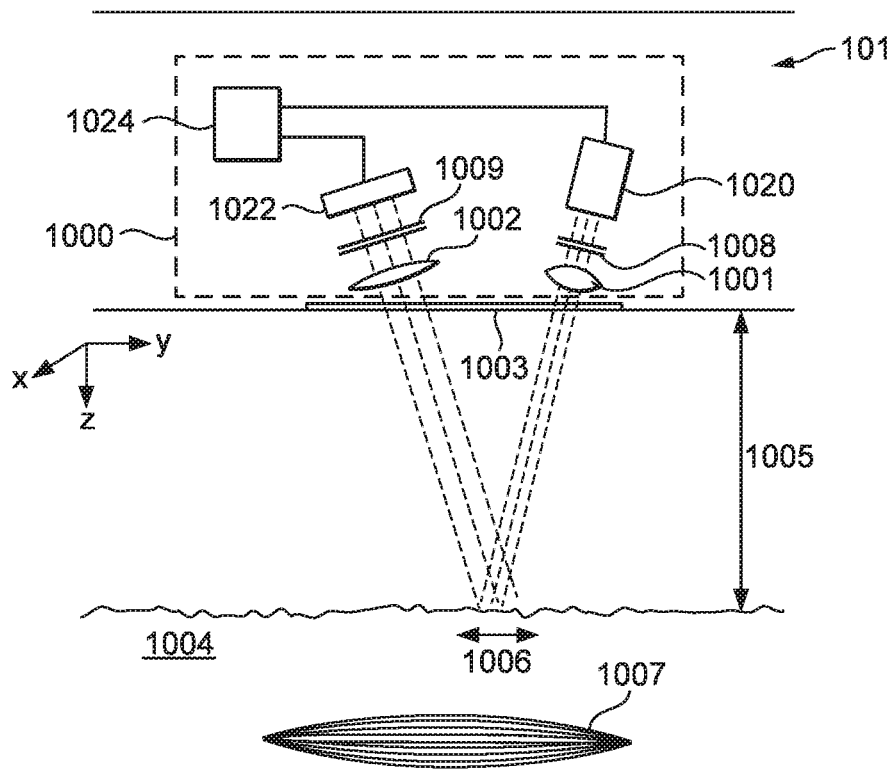
FIG. 10 illustrates an optical sensor.

An optical sensor 1000 is shown in FIG. 10. The optical sensor includes a light source 1020, a light sensor 1022, and a processor 1024 for processing the output of the light sensor so as to determine a time-varying signal representative of dynamic information such as the relative movement between the sensor 1000 and the skin 1004. The light source 1020 is arranged to illuminate the patch of skin 1004 whose dynamic behaviour is to be detected. The light source may be, for example, an LED or a laser. A suitable lens 1001 may be provided in the light path so as to, for a given distance 1005 from the sensor to the skin, focus the light onto a patch of skin of suitable size which is to be imaged. Similarly, a suitable lens 1002 may be provided in the reflected light path so as to, for a given distance 1005 from the sensor to the skin, focus the reflected light onto the light sensor 1022. The processor 1024 may be configured to capture skin movement transverse, or substantially transverse, to the imaging direction of the optical sensor 1000 using suitable algorithms configured to track movement of a surface. Algorithms of the type used in optical computer mice to track the relative movement of the mouse over a surface can be suitable.

Preferably or advantageously lens 1001 is a collimating lens so as to avoid the size of the illuminated area and the effective intensity of the light incident at the skin varying significantly as the distance between the skin and optical sensor varies. Lens 1002 is preferably or advantageously an imaging lens selected so as to focus the reflected light from the patch of illuminated skin at the light sensor 1022 and allow the light sensor to capture the texture of the skin. One or both of the lenses 1001 and 1002 may be replaced or augmented by a diffraction grating. The processor 1024 may be configured to perform suitable computational algorithms optimized to detect dynamic behaviour of the skin 1004 given the pattern created at the image sensor by the diffraction grating(s). A diffraction grating may be integrated with the image sensor 1022 in order to provide a compact imaging unit. For example, the image sensor 1022 may be a Rambus Lensless Smart Sensor.

The light sensor may be, for example, a Charge Coupled Device (CCD) or a Complementary Metal-Oxide-Semiconductor (CMOS) sensor.

It can be advantageous to provide one or both of filters 1008 and 1009 in the light path from the light source to the skin, and from the skin to the light sensor, respectively. Each of the filters 1008, 1009 could be any suitable kind of filter, such as a polarising filter and/or a colour filter. For example, the filters 1008 and 1009 could both be polarising filters arranged to apply the same polarisation to the light passing through the filter. This arrangement can help the sensor to distinguish light which originated from the light source and was reflected from the skin from ambient light. In a second example, filter 1009 could be a polarizing filter oriented so as to pass plane-polarised light reflected from skin 1004 and attenuate light having other polarisations. Typically reflected light is at least partially plane-polarized with a direction of polarization parallel to the reflecting surface; the corresponding direction of polarization can be selected for a plane polarizing filter 1009. This can help to isolate reflected light from ambient light. In some examples, filter 1008 may additionally be provided as either a polarizing filter whose axis of polarization is substantially oriented at 90 degrees to filter 1009 (i.e. cross-polarised with respect to filter 1009) or plane-polarized with a direction of polarization substantially parallel to the reflecting surface.

The optional filters 1008, 1009 may be coloured filters arranged to pass frequencies of light which are particularly advantageous for imaging skin and/or rejecting ambient light. Filter 1008 may be employed to provide substantially monochromatic illumination if light source 1020 emits a broad spectrum of colours. In the event that light source 1020 is monochromatic (whether alone or when combined with filter 1008), filter 1009 may be a filter arranged to preferentially or advantageously pass light of that colour so as to reject ambient light of other colours. This can help the optical sensor to isolate changes in the light received at the light sensor due to movement of the skin from changes in environmental lighting conditions at the skin (e.g. due to a user wearing headwear including the optical sensor moving about relative to a set of environmental light sources). This is particularly relevant where the distance from the skin to the optical sensor is several millimetres and shrouding is not provided to shield the area of skin being sampled by the optical sensor from environmental light. Infra-red light is particularly advantageous for imaging skin and avoids the skin of the user being visibly illuminated by the optical sensor.

Filters 1008, 1009 may be integrated with the light source and light sensor, respectively. Additionally or alternatively, filters 1008, 1009 may be integrated with the lenses 1001 and 1002, respectively. The lenses 1001 and 1002 may be provided as a single piece into which optional filters 1008 and/or 1009 may be integrated. In the event that the light source 1020 is a laser, the laser itself may be polarized—a further polarizing filter may or may not be required to produce light of a desired polarization.

One or both of the lenses 1001 and 1002 may be adjustable so as to enable optimal performance to be maintained over a range of distances 1005 between the optical flow sensor 1000 and the skin 1004. For example, lens 1002 may have a variable focal length so as to accommodate a range of distances 1005 whilst ensuring fine detail illuminated at the skin is captured at the light sensor 1022. Typically, however, it is possible to achieve good performance over a range of distances 1005 (e.g. a range of several millimetres for a distance of around 5 mm) with a fixed focal length lens 1002.

A window 1003 may be provided within the housing in which the optical sensor is located. In FIG. 10, the housing is shown by way of example as the frame body 101 of the glasses shown in FIG. 1. The window is preferably or advantageously transparent to the frequency of light emitted by the light source 1020. The window may support a coating designed to prevent reflection of the colour of light emitted by the light source 1020. Preferably or advantageously the window is one and the same as the lenses 1001, 1002; additionally or alternatively the window may include the filters 1008, 1009.

Preferably or advantageously, the light source 1020 is a laser. The coherent nature of laser light is particularly suitable for revealing fine detail in the skin and hence allowing accurate tracking of skin movements. The laser could be a vertical-cavity surface-emitting laser (VCSEL) which offers a compact, low power light source suitable for use in a battery-powered device.

The processor 1024 may further control the illumination of the skin by the light source 1020. The processor 1024 and the light sensor 1022 may be provided as a single integrated circuit. The light sensor 1022 may be configured to capture an array of pixels, e.g. a 16×16 array, 18×18 or 30×30 array of pixels. A resolution at the skin of around 0.1 mm has been found to offer good performance—this can be achieved by providing a suitable number of pixels and a suitable lens 1002 given the sensor-skin distance 1005.

In some examples, more than one optical sensor may be provided.

In a recognition phase, the area of the skin can be imaged by the optical sensor, and the captured image processed in dependence on the stored data set to determine a correspondence between the captured image and the skin characteristics for the one or more user. Suitably, the captured image, and hence the user, can be authenticated by associating the captured image with one of the one or more user, in dependence on the determined correspondence.

Suitably, the optical sensor does not move relative to the headwear, for example the frame body, although in some examples it could move relative to the headwear, for example to image a different area.

In preferred or advantageous examples, the optical sensor is configured to capture a series of images of an area of skin of a user. This can reveal dynamic features that a single static image may not reveal.

The image and/or series of images can be processed as an image signal, which can include for example a signal representative of the image and/or series of images.

Figure 9:
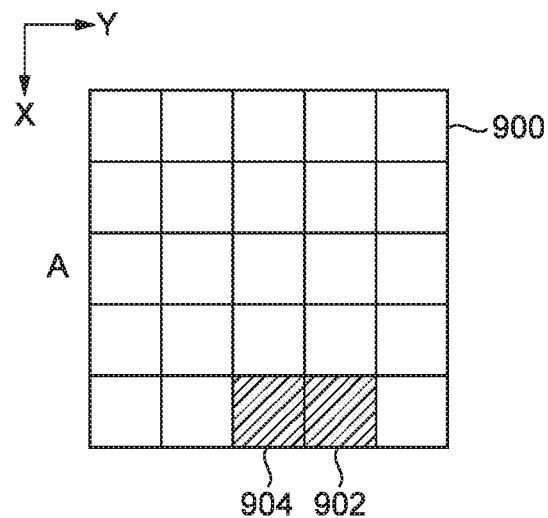
FIG. 9 illustrates a series of images captured by an optical sensor.
Figure 9:
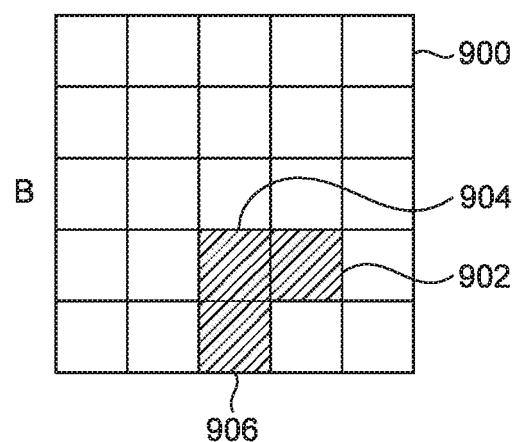
Figure 9:
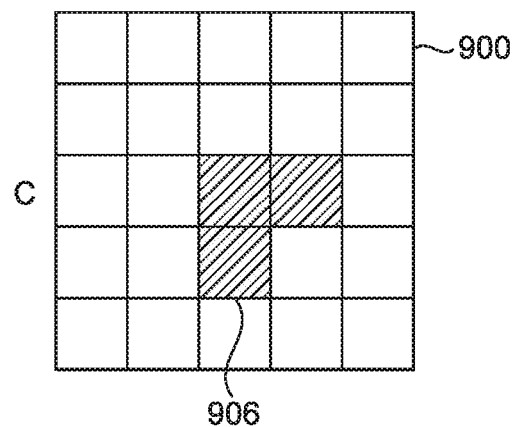

As a facial expression is performed, muscle activity in the face causes the skin to move. Suitably therefore the optical sensor is configured to image an area of skin such that the skin will, during a facial expression, move past the optical sensor. In this way, the optical sensor is able to image an area of skin that is greater than the field of view of the optical sensor. This is schematically illustrated in FIG. 9. The optical sensor can image an area of a particular size within its field of view 900. In FIG. 9A, a first image taken at a first time images a first area of skin. The shaded areas (which might represent pixels or groups of pixels) 902, 904 show a feature of the skin in the first image. This feature can be any feature mentioned above, or combination of such features.

FIG. 9B shows a second image taken at a later, second time. Since the skin has moved relative to the sensor between the first time and the second time, the second image is of a second area of skin. The second area of skin partially overlaps the first area of skin. The feature at the shaded areas 902, 904 in the second area is shown to have moved upwards relative to its position in the first image. Similarly, FIG. 9C shows a third image taken at a later, third time. Since the skin has moved relative to the sensor between the second time and the third time, the third image is of a third area of skin. The third area of skin partially overlaps the second area of skin. The feature at the shaded areas 902, 904 in the third area, is shown to have moved upwards relative to its position in the second image.

FIGS. 9B and 9C reveal another shaded area 906 which is not visible in the first image since it lies outside the first area. The series of images shown in FIGS. 9A to 9C therefore permit an area greater than any of the first, second or third areas on their own to be imaged. Thus an optical sensor with a particular field of view can be used to image an area of the skin greater than that field of view.

The presence in the first, second and third images of the same reference points (the shaded areas 902, 904) permit the three images to be combined (or 'stitched') together. This can form a composite image. Suitably the series of images overlap at least an adjacent image in the series, or abut an adjacent image in the series, such that the images may be combined together. The images may be combined using any appropriate image processing technique. This can permit smaller and/or cheaper optical sensors to be used to image larger areas of skin than would be possible by taking single images.

Suitably the series of images are captured by the optical sensor at a rate that permits the areas of the skin imaged by each of the series of images to overlap or abut one another. For example, for typical skin movement speeds during expressions mentioned herein, a frame capture rate of 30 frames per second (fps), or approximately 30 fps may be suitable. The frame rate can be increased or decreased as appropriate, for example, facial expressions that result in slower facial skin movement can mean that reduced frame rates are sufficient to capture the required data that may be necessary.

In some examples, the frame rate at which the series of images is captured is at least about 30 frames per second (fps). Suitably the frame rate is greater than about 30 fps. Suitably the frame rate is greater than about 50 fps, or greater than about 80 fps, for example about 90 fps. Higher frame rates can be used. Higher frame rates are likely to result in capturing a series of images which more accurately represent, or track movement of, the areas of the skin, particularly for expressions involving faster facial skin movement.

Suitably, the taking of a series of images additionally or alternatively permits dynamic information to be determined, for example how a wrinkle develops over time. An example of this is a wrinkle at the corner of the eye that develops when a person smiles. The transient development of the wrinkle will be different for different people. The wrinkle may develop faster in some people than others. The wrinkle may develop to become a larger wrinkle in some people than others. The location of the wrinkle is also likely to differ between people. Detecting how the wrinkle (or more generally, any facial feature or combination of facial features) develops over time can permit user-identifiable information to be obtained which can be used, as discussed herein, to form a data set and/or to authenticate a user against a data set. Another example of dynamic information would be how far and/or how fast a feature such as a pigmented area moves. Another example is how the shape of a pigmented area changes over time during a facial expression. Many other examples are possible.

Suitably the captured image, or image signal, can be processed. Suitably the captured image, or image signal, can represent a time-varying signal. The processing can include any suitable image processing technique. Suitably the processing can include one or more processing technique as described herein.

Figure 12:
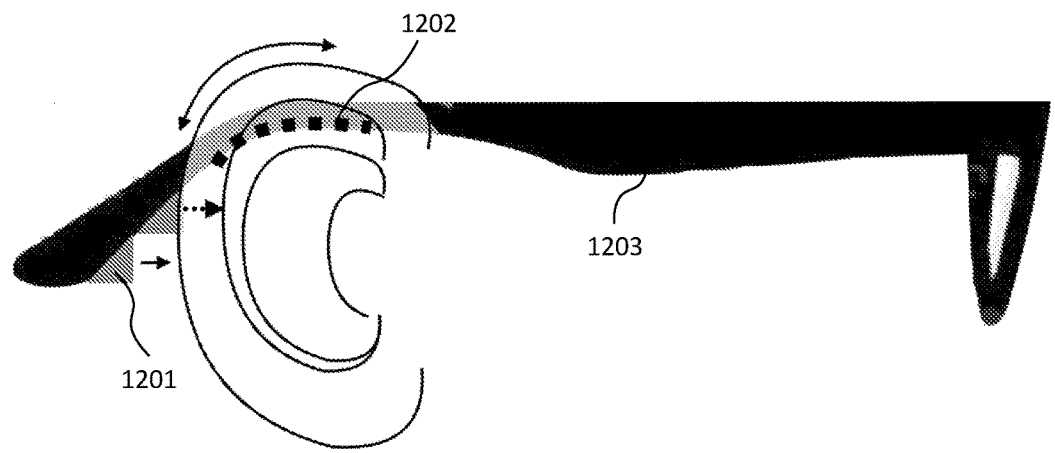
FIG. 12 shows a pair of glasses 1203 including one or more proximity sensor 1201 and one or more contact sensors 1202 arranged about the ear.
Figure 13:
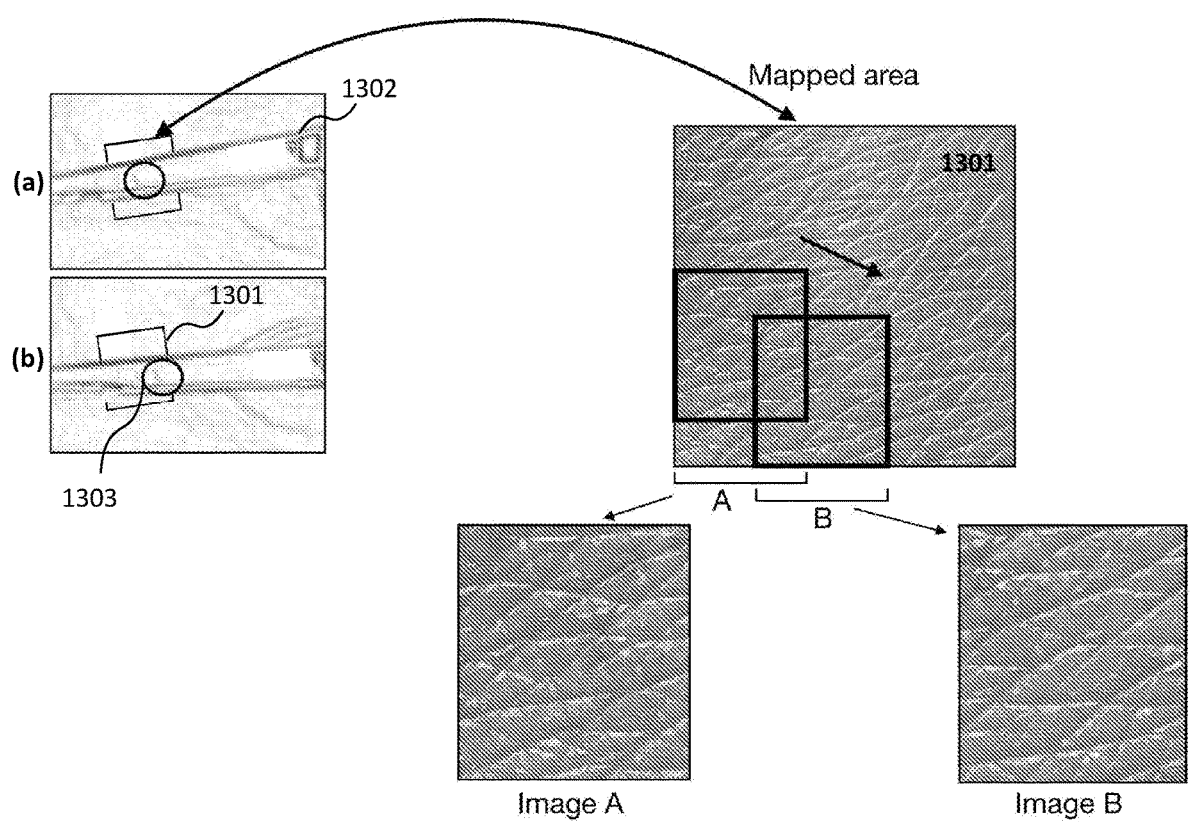
FIG. 13 illustrates detection of movement of the glasses relative to the skin at an optical flow sensor located at the temple of a pair of glasses.

FIG. 13 illustrates the skin microstructure of a region 1301 captured by an optical sensor 1303 located at the temple of a pair of glasses 1302. Biometric information describing the microstructure of region 1301 for one or more users may be held by a biometric system. The information could be an image of the region 1301 (potentially processed so as to enhance or emphasise features such as wrinkles, blemishes, skin texture, etc.) or any other information characterising features of the region of skin 1301. As illustrated in the figure, a region of skin for which biometric information is to be held for users and which is to be captured by an optical sensor in order to authenticate a user may be substantially larger than the area imaged by an optical sensor which, in use, is arranged at headwear so as to image that region. For example, in FIG. 12, Images A and B illustrate images captured by optical sensors within a larger region 1301 which may be used to perform biometric identification. In a first position labelled (a) in the figure, the sensor captures the area of region 1301 which is shown in Image A. In a second position labelled (b) in the figure, the sensor captures the area of region 1301 which is shown in Image B.

A user for which information representing region 1301 is stored at a biometric system may be identified from either of the images A and B shown in FIG. 13. This enables biometric identification to be performed when the optical sensor is at a range of positions relative to the user's head. Variations in the position of optical sensors relative to the head of a user can be expected because from one use to the next headwear will typically not be replaced in precisely the same position, and during use some movement relative to the face can be expected to occur (e.g. slippage of a pair of glasses down the nose). In the example shown in FIG. 13, optical sensor 1303 takes two positions relative to the skin in the temple area: at the position shown in (a) the optical sensor captures Image A, and at the position shown in (b) the optical sensor captures Image B. In this example the movement of the glasses could be due to slippage of the glasses down the nose and hence the movement of the glasses relative to the skin as indicated by the arrow in the image of region 1301 shown in the figure.

The headwear 100, 200 may include one or more lens adapted to, in use when the headwear is worn, focus light reflected from an area of skin onto the optical sensor. The optical sensor may include a diffraction grating adapted to create a known diffraction pattern on the sensor so as to enable lens-less image capture.

The headwear may include one or more light sources arranged to illuminate the area or areas of skin in the field of view of the optical sensor. The one or more light sources may be adapted to illuminate the area(s) of skin with non-visible light. The one or more light sources may be one or more lasers suitable for use at human skin. At least one of the one or more light sources may be substantially monochromatic and the optical sensor may include a filter adapted to preferentially or advantageously pass light of the colour emitted by the light source.

The optical sensor may be configured to receive light reflected from the area of skin through a plane-polarized filter oriented such that, in use when the headwear is worn, the plane of polarization of the filter is substantially parallel to the plane of the area of skin.

The optical sensor and any optical elements in the light path between an area of skin and the optical sensor may be arranged so as to not contact the skin when the apparatus is worn.

The areas of skin imaged by the optical sensor may be no larger than 20 square millimetres, preferably or advantageously no larger than 15 square millimetres, and most preferably or advantageously no larger than 10 square millimetres.

In some examples, the system may include sensors for sensing electrical muscle activity and optical sensors for sensing skin characteristics. The system may authenticate a user using the electrical muscle activity sensors and/or the optical sensors. Suitably, the system may be configured to authenticate the user to a higher level (or to provide for a greater level of security) by requiring that authentication be provided by both the electrical muscle activity sensors and the optical sensors.

In some examples, authentication may still be provided by the system where authentication would have been refused by using may be only one of the electrical muscle activity sensors or the optical sensors. For example, where the system uses the electrical muscle activity sensors (or the optical sensors) to generate an authentication result that fails by a particular amount or tolerance, but the system uses the optical sensors (or the electrical muscle activity sensors) to generate a positive authentication result, the overall result may be positive. This is suitably the case where the failure amount or tolerance is within predetermined levels. These predetermined levels can be selected to ensure that the levels required that may be necessary remain associated with the respective user. For example, the tolerance might suitably be within 15%, 10% or 5% of the respective threshold for that user.

Where authentication is based on the behaviour of multiple features (such as signal features derived from channels of EMGs and/or optical image features), the system can be arranged to authenticate a user where, say, three features from EMG data are satisfied or where, say, two features from EMG data and one optical image feature are satisfied. The numbers of features that may be required, and the numbers of features from each source (i.e. EMG or optical image) can be varied as desired to obtain the required level of security that may be necessary.

A particularly advantageous approach to enrolling or calibrating a user using the headwear is to treat the outputs of the sensors (preferably or advantageously information describing the time-varying signals output by the or each sensor) as inputs to a machine learning system. By causing a user to perform different facial expressions and informing the machine learning system which facial expressions are being activated, the machine learning system can (using suitable algorithms) learn to identify what set of inputs (and optionally their variation over time) are associated with each facial expression. The machine learning system may provide a dataset for use by the processor so as to enable the processor to authenticate the time-varying signal as being associated with one or more users, according to the scheme learned by the machine learning system.

A machine learning system for learning electrical muscle activity and/or dynamic skin information, associated with one or more facial expressions, may be provided at a computer system to which the headwear 100, 200 is connectable, and the headwear may be provided with a learning mode (which might be a calibration mode) in which the outputs of the sensors are passed through to the machine learning system at the computer system. A dataset formed by such a machine learning system may be stored at a data store (suitably at the computer system, such as at the remote device 400) for use by the processor. Such a dataset could include, for example, an algorithm or set of parameters for a predefined algorithm, executable code for the processor, and so on.

The machine learning algorithm or model (or the algorithm trained by machine learning or the model formed using machine learning) need not use pattern recognition. In some examples, the machine learning algorithm can be used to distinguish between users in a population as the users perform the same expression or series of expressions. The algorithm is suitably trained by machine learning to be able to differentiate between the users, for example by optimising or maximising the differences between outputs of the algorithm or model.

Biometric identification of a user may be performed using headwear including one or more sensors configured for determining the size of the user's head and/or one or more of their gross features, such as the position of their ears. For example, proximity sensors may be provided at headwear at locations so as to capture a measure of the distance between the sensor and the skin of the temple region. For headwear apparatus in which such sensors are located at fixed positions, in use when the apparatus is in position, such distance information is representative of the size of the user's head.

One or more further proximity sensors may be provided in order to detect when the headwear is in the correct position on the user's face. For example, in the example of a pair of glasses, a proximity sensor (e.g. around the position of sensor 108 in FIG. 1) may be provided at the bridge of the glasses over the glabellar muscle in order to detect when the glasses are located in the correct position (e.g. sitting high on the bridge of the nose close to the face). The biometric system may be configured to measure distance to the temple skin from proximity sensors on the arms of the glasses when the distance from the glasses to the skin overlying the glabellar muscle as measured by the respective proximity sensor indicates that the distance is within a predefined range—that predefined range may indicate that the glasses are in the correct position.

Additionally or alternatively, proximity sensors may be provided at locations other than over the temple so as to form measurements of the distance from those respective sensors to the head and hence provide an indication of the head size which may be used as a biometric identifier of the user.

Additionally or alternatively, sensors may be provided to detect the position of the ears when the headwear is worn in a predetermined position by a user. For example, a pair of glasses 1203 are shown in FIG. 12 which include one or more sensors for determining the position of the ear relative to the glasses. A contact sensor 1202 may be provided to determine which part of the arm of the glasses rests in contact with the ear. The contact sensor may be any kind of sensor for detecting contact with the skin. For example, the contact sensor could be a set capacitive sensing elements arranged along the arm of the glasses in the region in which it is expected the glasses will rest on the ear and configured so as to indicate which of the elements are in contact with the skin—since the position of the elements on the arm of the glasses is known, the elements which are in contact with the ear skin indicate where the ear is relative to the position of the glasses. When the glasses are worn in the correct position, the position of the ear may therefore be determined and hence used as a biometric identifier of the user.

The sensors used to detect the position of the ears may alternatively or additionally include one or more proximity sensors 1201 mounted at the distal end of the arms of the glasses and arranged so as to measure the distance from the sensors to post-auricular skin behind the ear. Since the position of the proximity sensors on the arms of the glasses is known, the distance between the proximity sensors and the skin behind the ear indicates where the ear is relative to the position of the glasses. When the glasses are worn in the correct position, the position of the ear may thus be determined and used as a biometric identifier of the user.

The proximity sensors may be any suitable kind of sensor—for example, one or more of an ultrasound sensor configured to measure distance based on time of flight and/or phase changes detected between a transmitted and received reflected signal, a laser or other light source configured to illuminate the skin with divergent beams such that the separation of a received reflected signal is indicative of the distance the light has travelled, and a light source and light intensity detector configured to determiner the distance to the skin from the intensity of the reflected light from the light source which is received at the light intensity detector from the skin.

It may be determined that the glasses are in the correct position through the use of a proximity sensor at the bridge of the glasses in the manner described above. Such a proximity sensor could be one and the same as the proximity sensor described above for causing at least some parts of the sensor system to enter a sleep state (e.g. on the distance that sensor measures to skin overlying the glabellar exceeding some predefined threshold) or powering up (e.g. on the distance that sensor measures to skin overlying the glabellar falling below some predefined threshold, and optionally on the arms of the glasses being extended as detected by sensors at hinges at the arms of the glasses).

More generally, the glasses described herein by way of example could be any kind of headwear, including a helmet, virtual or augmented reality headset, and headphones.

Biometric identifiers formed based on the size of a user's head relative to headwear including a set of one or more sensors at fixed positions on the headwear may be used as a crude biometric that roughly identifies the user. Such a biometric can be useful where security is not paramount and a quick determination as to which user is wearing the headwear is may be required—for example, the headwear could be a VR headset and the biometric identification described herein may be performed in order to select between different avatars representing each user in a computer game.

In some examples, the system is suitably configured to determine the gaze of a user. In other words, the system is able to determine a direction in which a user is looking. This can be done in one of several ways. The headwear can for example include sensors for electrooculography (EOG). These sensors can include additional sensors, such as dedicated EOG sensors, or they can include other sensors such as EMG sensors, or electric potential sensors, which can be used to detect the orientation of the eye within the socket, and hence determine the direction of gaze of a user. Suitably, the sensors are configured to detect differences between the relatively higher charge towards the back of the eye and the relatively lower charge towards the front of the eye. These differing charges produce a detectable dipole, which can be used to infer the user's gaze.

Additionally or alternatively, the headwear can include one or more motion sensor, such as an inertial measurement unit, configured to determine the movement of the headwear in three dimensions. This can either assume that a user is looking along a direction which is fixed relative to the orientation of the headwear (and so determine the user's gaze from the orientation of the headwear), or it can take into account a user's direction of gaze as determined from, for example, eye dipole measurements to vary this direction (such that the user's gaze is determined from the combination of headwear orientation and where the eyes are looking relative to the headwear orientation). This combined approach can lead to a more accurate system, and one which is more natural to a user of the system.

Detection of a user's gaze in this way can be used to be able to choose or select between options. For example, this approach can be used in an authentication process (either separately from or together with other authentication processes described herein).

Figure 11A:
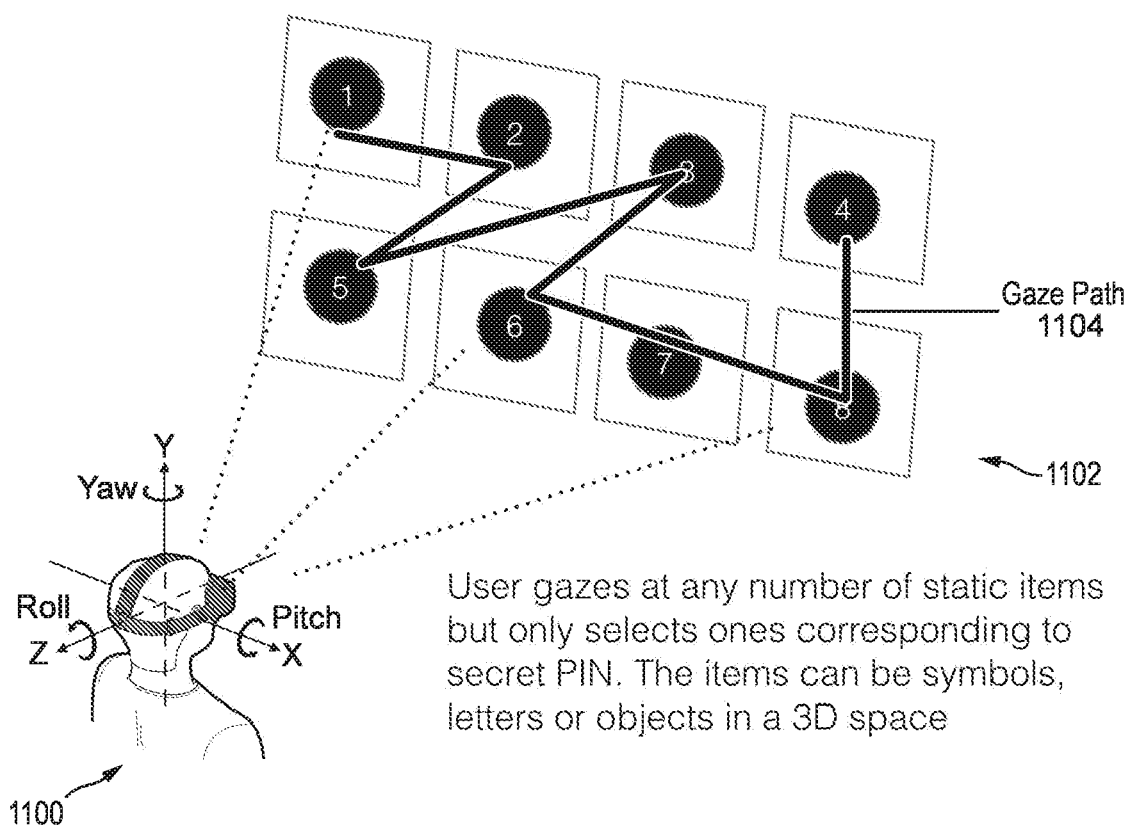
FIGS. 11A to 11D illustrate how facial EMG can be combined with other parameters.

In some examples, eye gaze can be used to enter a password or personal identification number (PIN). This is illustrated in FIG. 11A, which shows a person wearing headwear 1100 for determining the 3D orientation of the headwear. FIG. 11A shows use of VR headwear. A virtual display (illustrated for ease of understanding separately at 1102) is configured to display a number of options: here, the display displays the numbers 1 to 8. Any other set of numbers, letters, characters, symbols and/or objects in 3D space and so on could be used. In general, the display can display a number of items for selection. The user directs their gaze along the series of items as shown by the gaze path 1104. The user can perform a selection action when the gaze falls upon an item which the user wishes to select. The selection action can take any appropriate form. For example, the selection action can include the user pausing while looking at the desired item for selection, pressing a button, performing a facial expression and so on. Suitably feedback is provided to the user when an item is selected. This feedback can take any suitable form such as visual feedback, for example the item being highlighted, audio feedback, for example a beep, haptic feedback, for example a vibration, and so on. In this approach, the user is able to look at the items in any order, and to select may be only the desired items by performing the selection action.

In some examples, the selection action is a jaw clench (i.e. detection of the characteristic electrical muscle activity associated with a jaw clench). This has the advantage that it is discreet, and so less likely to be noticed by a third party observer as the user makes the selection.

Combining eye gaze with headwear orientation, and/or selecting an option using a discreet expression, can assist in obscuring the selected option from third parties. This can assist in improving the security of the system, for example by helping to protect the user's PIN.

Figure 11B:
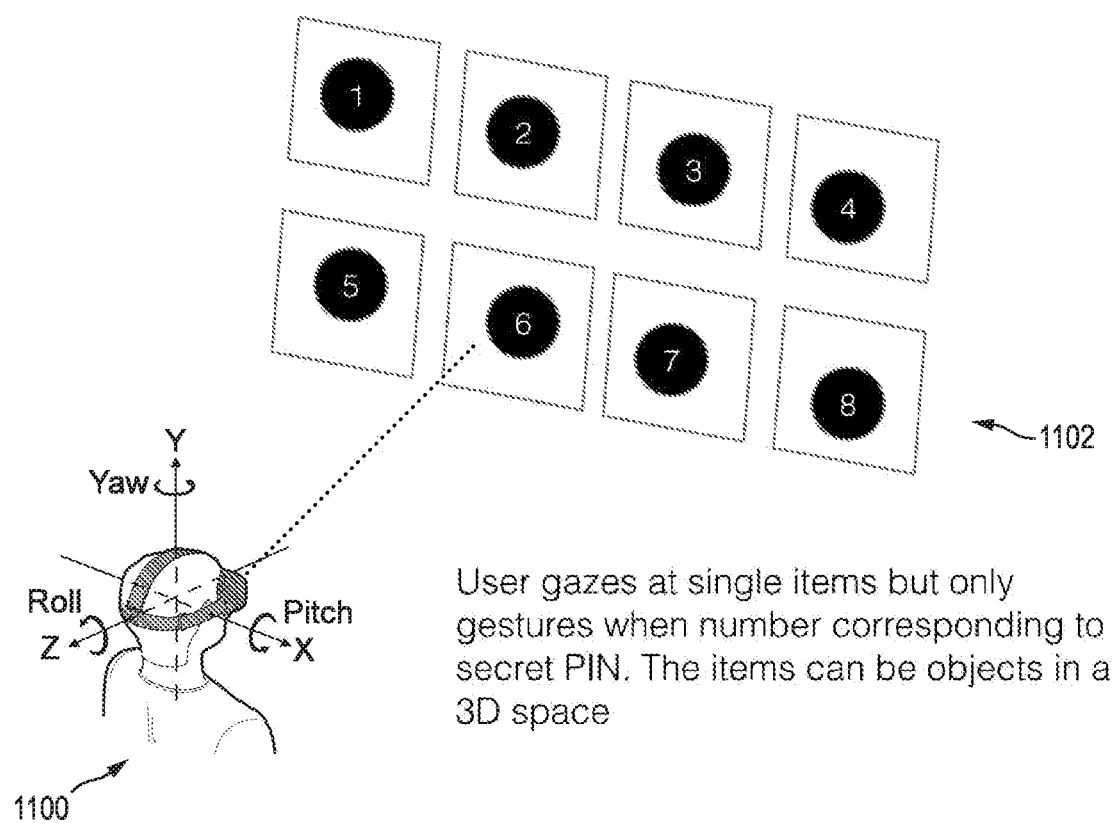

In another example, as illustrated in FIG. 11B, a user 1100 may gaze at a single item on the display 1102, and make a selection action when they are looking at the item to be selected. Following the selection, the user may gaze at another item. The display may change after one or more selection actions have been made, to present the user with other items or combinations of items for selection. This can help to increase the complexity of the password that the user enters, and so improve security.

Figure 11C:
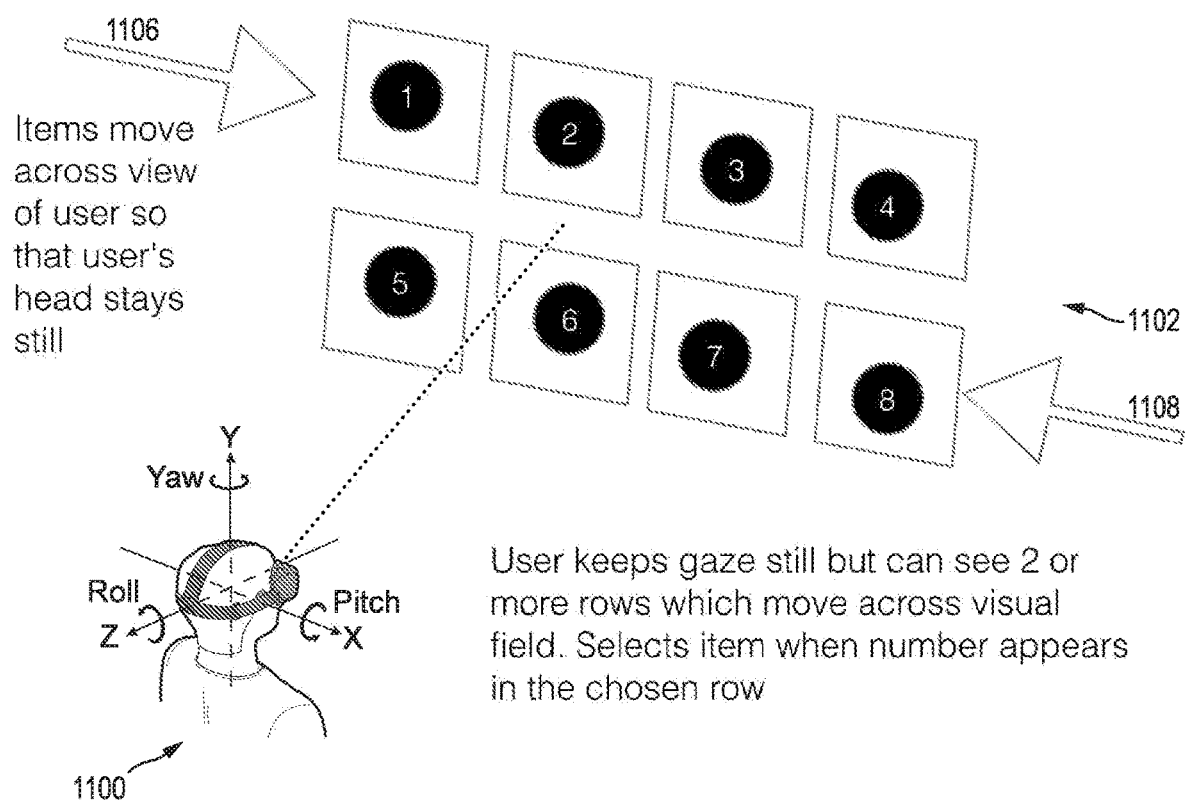
Figure 11D:
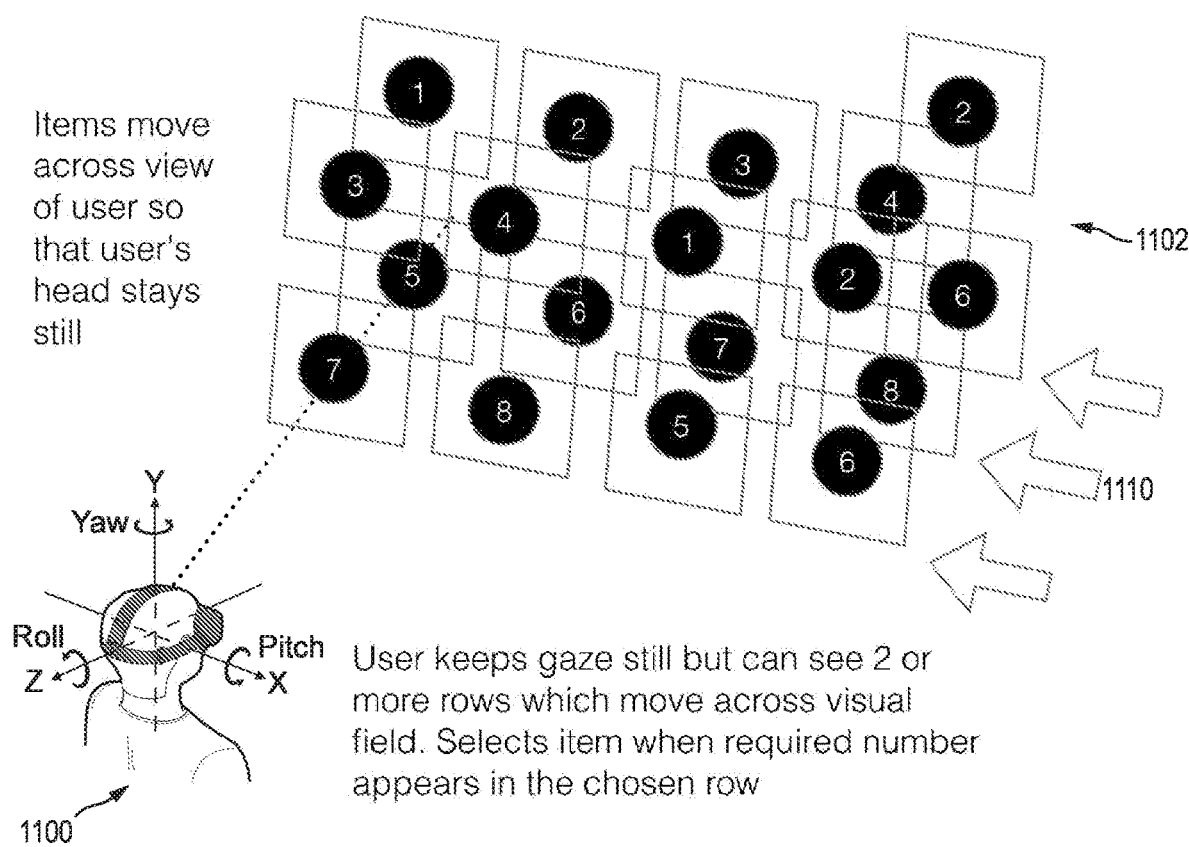

In another example, illustrated in FIG. 11C, one or more items can move or scroll across the display 1102, as indicated by the arrows 1106, 1108. In this example the user may keep their gaze constant or still, and can perform the selection action when the desired item for selection passes across the direction of their gaze. In applications such as VR headsets, where the display is not visible to third parties, this can help obfuscate the selections being made by the user, since the third party is not able to determine the items that the user is looking at when making their selection (which may be possible where the user's head movements are visible). In a modification to this example, as illustrated in FIG. 11D, multiple rows can move (as indicated by the arrows 1110) across the path of a user's gaze so that more than one item at a time can be seen by the user along the direction of their gaze. This is represented in FIG. 11D by the row including numbers 7-8-5-6 being presented in front of the row including numbers 5-6-7-8, and so on. A selection action can be performed when the desired item appears in the chosen row, known to the user. A third party observer will not know in which row the user is selecting items. This can also aid security by providing further obfuscation to the user-selected item or sequence of items.

The level of security can be selected as desired, for example by varying the number of items available for selection and/or the number of gestures may be required for authentication.

The apparatus and system of FIGS. 4A, 4B and 10 are shown as including a number of functional blocks. This is schematic only and is not intended to define a strict division between different logic elements of such entities. Each functional block may be provided in any suitable manner. It is to be understood that intermediate values described herein as being formed by sensors or processors need not be physically generated by the sensor/processor at any point and may merely represent logical values which conveniently describe the processing performed by the sensor/processor between its input and output. The use of the term "image capture" need not imply that an image is formed or output by an optical sensor or processor and may refer generally to capturing contrast, texture or other information by an optical sensor which does not lead to an image being formed.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may include one or more processors.

The applicant hereby discloses in isolation each individual feature described herein and any combination of two or more such features, to the extent that such features or combinations are capable of being carried out based on the present specification as a whole in the light of the common general knowledge of a person of ordinary skill in the art, irrespective of whether such features or combinations of features solve any problems disclosed herein, and without limitation to the scope of the claims. The applicant indicates that aspects of some embodiments may include or can consist of any such individual feature or combination of features. In view of the foregoing description it will be evident to a person skilled in the art that various modifications may be made within the scope of some embodiments.

The invention claimed is:

1. A biometric authentication system, comprising:
headwear including a plurality of biosensors each configured to sample muscle activity so as to obtain a respective time-varying signal, wherein the biosensors are located on the headwear such that, in use when worn by a user, the biosensors are configured to detect muscle activity of a predetermined plurality of facial muscles comprising corresponding muscles from each side of the user's face;
a data store for storing a data set representing characteristic muscle activity for one or more users; and
a processor configured to:
process the time-varying signals from the biosensors to determine a measure of asymmetry in the muscle activity of the corresponding muscles from each side of the user's face;
process the time-varying signals from the biosensors in dependence on the stored data set so as to determine a correspondence between a time-varying signal and characteristic muscle activity of one of the one or more users, and
in dependence on the determined correspondence and the determined measure of asymmetry, authenticate the time-varying signals as being associated with the user.

2. The biometric authentication system according to claim 1, wherein the predetermined plurality of facial muscles includes a muscle that is involuntarily co-contracted in at least one facial expression.

3. The biometric authentication system according to claim 1, wherein the data set includes a stored time-varying signal, and the processor is configured to process the time-varying signals in dependence on the stored data set by comparing the time-varying signals to the stored time-varying signal.

4. A biometric authentication system according to claim 3, wherein the processor is configured to compare the time-varying signals to the stored time-varying signal by determining whether the signals are within a predetermined tolerance of one another.

5. The biometric authentication system according to claim 1, wherein the data set includes one or more stored signal features, and the processor is configured to process the time-varying signals in dependence on the stored data set by comparing one or more signal features of the time-varying signals to the one or more stored signal features.

6. The biometric authentication system according to claim 5, wherein the processor is configured to determine whether a threshold number of signal features of the time-varying signals correspond to the one or more stored signal features.

7. A biometric authentication system according to claim 5, wherein the processor is configured to determine that a signal feature of the time-varying signals corresponds to a stored signal feature where the respective signal features are within a predetermined tolerance of one another.

8. A biometric authentication system according to claim 5, wherein the processor is configured to determine that a signal feature of the time-varying signals corresponds to a stored signal feature where the signal feature exceeds a threshold value for that signal feature determined in dependence on the stored signal feature.

9. A biometric authentication system according to claim 1, wherein the characteristic muscle activity represented by the data set includes a measure of at least one selected from the group consisting of:
an amplitude of at least one of the time-varying signals;
a variation with time of the amplitude of at least one of the time-varying signals;
a measure of asymmetry in the muscle activity of corresponding muscles from each side of the user's face; and
the timing of activation of at least one facial muscle, relative to a common time base or to the timing of activation of at least one other facial muscle.

10. A biometric authentication system according to claim 1, wherein the processor is configured to determine the correspondence between the time-varying signals and the characteristic muscle activity by at least one selected from the group consisting of:
applying a pattern recognition algorithm; and
applying an analysis of variance test.

11. A biometric authentication system according to claim 1, wherein the processor is configured to process the time-varying signals to obtain a plurality of representative values of the time-varying signals, the data set including a plurality of stored representative values, the representative values and the stored representative values being generated by a pre-defined algorithm, wherein the processor is configured to compare the representative values to the stored representative values.

12. A biometric authentication system according to claim 1, wherein one or more of the biosensors are electric potential sensors.

13. A biometric authentication system according to claim 1, wherein the headwear includes sensors for determining the user's gaze.

14. A biometric authentication system according to claim 1, wherein the processor is configured to process the time-varying signal by at least one selected from the group consisting of:
clipping the signal;
signal denoising;
applying a signal baseline correction;
using onset detection;
using data segmentation;
applying a log-transform; and
extracting one or more features from the signal.

15. A biometric authentication system according to claim 1, wherein the sampled muscle activity is electrical muscle activity and the stored data set comprises characteristic electrical muscle activity for the one or more users.

16. A biometric authentication system according to claim 1, wherein the biometric authentication system is configured to output an authentication signal for controlling access to a resource.

17. A method for authenticating a user wearing headwear, the headwear including a plurality of biosensors configured to sample muscle activity comprising corresponding muscles from each side of the user's face, the method comprising:
sampling, using each of the plurality of biosensors, muscle activity of the user to obtain a respective time-varying signal;
processing the time-varying signals from the biosensors to determine a measure of asymmetry in the muscle activity of the corresponding muscles from each side of the user's face;
processing the time-varying signals from the biosensors in dependence on a data set representing characteristic muscle activity for one or more users so as to determine a correspondence between a time-varying signal and characteristic muscle activity of one of the one or more users; and
in dependence on the determined correspondence and the determined measure of asymmetry, authenticating the time-varying signals as being associated with the user.

* * * * *